United States Patent
Muro

(10) Patent No.: US 11,126,948 B2
(45) Date of Patent: Sep. 21, 2021

(54) ANALYSIS METHOD AND COMPUTER

(71) Applicant: HITACHI, LTD., Tokyo (JP)

(72) Inventor: Keiro Muro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 373 days.

(21) Appl. No.: 16/356,697

(22) Filed: Mar. 18, 2019

(65) Prior Publication Data

US 2020/0042926 A1 Feb. 6, 2020

(30) Foreign Application Priority Data

Jul. 31, 2018 (JP) .............................. JP2018-144427

(51) Int. Cl.
| | |
|---|---|
| *G05B 19/418* | (2006.01) |
| *G05B 23/02* | (2006.01) |
| *G06Q 10/06* | (2012.01) |
| *G06Q 50/04* | (2012.01) |
| *G06F 17/15* | (2006.01) |
| *G06F 17/18* | (2006.01) |
| *G06F 16/28* | (2019.01) |

(52) U.S. Cl.
CPC . *G06Q 10/06395* (2013.01); *G05B 19/41875* (2013.01); *G05B 23/024* (2013.01); *G05B 23/0221* (2013.01); *G06F 16/287* (2019.01); *G06F 17/15* (2013.01); *G06F 17/18* (2013.01); *G06Q 50/04* (2013.01)

(58) Field of Classification Search
CPC .............. G05B 23/024; G05B 23/0221; G05B 19/41875
See application file for complete search history.

(56) References Cited

U.S. PATENT DOCUMENTS

| | | | | |
|---|---|---|---|---|
| 6,289,257 B1 * | 9/2001 | Sekine | ............. | G05B 19/41875 700/121 |
| 6,766,283 B1 * | 7/2004 | Goldman | ......... | G05B 19/41875 703/2 |
| 7,494,893 B1 * | 2/2009 | Inani | ................ | G05B 19/41875 438/424 |

(Continued)

FOREIGN PATENT DOCUMENTS

JP 09-034721 A 2/1997

OTHER PUBLICATIONS

Japanese Office Action dated Jul. 7, 2020 for the Japanese Patent Application No. 2018-144427.

*Primary Examiner* — Ronald D Hartman, Jr.
(74) *Attorney, Agent, or Firm* — Volpe Koenig

(57) ABSTRACT

An analysis method performed by a computer analyzes analysis data acquired from a system which includes a plurality of devices to manufacture a product. The computer manages a set of values of each field of the analysis data as a column, analyzes a correspondence from a value belonging to a first target column to a value belonging to a second target column, specifies a surjection column pair which is a set of the first target column and the second target column which have a surjective correspondence, generates graph information to manage a graph of tree structure indicating a connection relation of the column by connecting a graph which has nodes of the first target column and the second target column of the surjection column pair, and performs a yield analysis to specify a parameter affecting an evaluation value using the graph information.

12 Claims, 29 Drawing Sheets

(56) References Cited

U.S. PATENT DOCUMENTS

| | | | | |
|---|---|---|---|---|
| 8,046,193 B2* | 10/2011 | Yetter, Jr. | ............ | G05B 23/0254 |
| | | | | 702/183 |
| 9,396,443 B2* | 7/2016 | Kaushal | ................. | G06N 20/00 |
| 2007/0156274 A1* | 7/2007 | Dierks | ................... | G06Q 10/06 |
| | | | | 700/108 |
| 2009/0037013 A1* | 2/2009 | Hendler | ........... | G05B 19/41875 |
| | | | | 700/103 |
| 2017/0371322 A1* | 12/2017 | Lake | ........................ | G01S 5/00 |
| 2021/0116818 A1* | 4/2021 | Bastani | ................. | H01L 22/12 |

* cited by examiner

FIG. 8

NOTATION RULE

RULE 1:
| 800 | 801 |
|---|---|
| [a1,a2,a3,...] | [A] |

RULE 2:
| 810 | 811 |
|---|---|
| {a1:b1,<br>a2:b2,<br>a3:b3,<br>...} | {A:B} |

RULE 3:
| | |
|---|---|
| {a1:[b1,b2,b3] ,<br>a2:[b4,b5,b6,b7] ,<br>a3:[b8,b9] ,<br>...} | {A:[B]} |

RULE 4:
| | |
|---|---|
| {a1:{b1:c1, b2:c2,}<br>a2:{b3:c3, b4:c4,b5:c5},<br>a3:{b6:c6,b7:c7},<br>...} | {A:{B:C}} |

FIG. 9

| FID (901) | PID (902) | TEMPERATURE (903) | PRESSURE (904) |
|---|---|---|---|
| 1 | 1 | 239 | 100 |
| 1 | 2 | 230 | 80 |
| 1 | 3 | 210 | 100 |
| ⋮ | ⋮ | ⋮ | ⋮ |

| PID | CONTROL DATA | | | STATE DATA | | | QUALITY DATA | |
|---|---|---|---|---|---|---|---|---|
| | TEMPERATURE 1 | PRESSURE 1 | ... | TEMPERATURE 1 | PRESSURE 1 | ... | DEFECT RATE | MATERIAL STRENGTH |
| 1 | 230 | 100 | ... | 228.8 | 108.2 | ... | 1.2% | 80.2 |
| 2 | 230 | 80 | ... | 227.9 | 79.8 | ... | 1.1% | 79.2 |
| 3 | 210 | 100 | ... | 210.2 | 108.1 | ... | 0.9% | 85.3 |
| ... | ... | ... | ... | ... | ... | ... | ... | ... |

FIG. 15

CARDINALITY INFORMATION 1500

| SCHEMA | { COLUMN_NAME :<br>{ CATEGORY : FREQUENCY }<br>} | ~1501 |
| --- | --- | --- |
| SAMPLE | {<br>A : {a1:2, a2:1, a3:1},<br>B : {b1:2, b2:2}<br>} | ~1502 |

FIG. 16

COLUMN CORRESPONDENCE INFORMATION 1600

| SCHEMA | { CATEGORY : [CATEGORY] } | ~1601 |
| --- | --- | --- |
| SAMPLE | { a1: [ b1,b2,b3 ],<br>a2: [ b4,b5 ],<br>a3: [ b6,b7,b8 ]} | ~1602 |

FIG. 17

SURJECTION COLUMN PAIR INFORMATION 321

1701 — SCHEMA
```
{
  COLUMN_NAME : {
    'cardinality' : { CATEGORY : FREQUENCY},
    'injection' : { COLUMN_NAME : { CATEGORY : CATEGORY } },
    'surjection' : { COLUMN_NAME : { CATEGORY : [CATEGORY] } }
  }
}
```

1702 — SAMPLE
```
A : {
  'cardinality' : { a1:3, a2:2, a3:1, a4:1 },
  'injection' : {
    X : { a1 : x1, a2 : x2, a3 : x3 }
    Y : { a1 : y1, a2 : y2, a3 : y3 }
  },
  'surjection' : {
    B : { b1 : [a1,a2], b2 : [a3], b3 : [a4] }
    C : { c1 : [a1,a2], c2 : [a3,a4] }
  }
},
B : {
  'cardinality' : { b1:5, b2:1, b3:1 },
  'injection' : { ... },
  'surjection' : {
    C : { c1 : [b1], c2 : [b2,b3] },
  }
},
C : {
  'cardinality' : { c1:5, c2:3 },
  'injection' : { ... },
  'surjection' : { }
}
```

FIG. 18

SURJECTION COLUMN INFORMATION 332

| | |
|---|---|
| SCHEMA | 'root' :GRAPH<br>GRAPH = { COLUMN_NAME : GRAPH} |
| SAMPLE | 'root': {<br>  A: {}<br>  B: {C: {}, D: {}}<br>  E: {<br>    F: {G: {}}<br>  }<br>} |

1801 — SCHEMA row
1802 — SAMPLE row

| PID | A  | B  | C  | D  | E  |
|-----|----|----|----|----|----|
| 1   | a1 | b1 | c1 | d1 | e1 |
| 2   | a2 | b1 | c1 | d2 | e2 |
| 3   | a3 | b2 | c2 | d2 | e1 |
| 4   | a4 | b3 | c2 | d2 | e2 |
| 5   | a3 | b2 | c2 | d2 | e2 |
| 6   | a4 | b3 | c2 | d2 | e1 |

```
{
 A : {
    'cardinality' : { a1:1, a2:1, a3:2, a4:2 },
    'injection' : { },
    'surjection' : {
       B : { b1 : [ a1,a2 ], b2 : [ a3 ], b3 : [ a4 ] }
       D : { d1 : [ a1 ], d2 : [ a2, a3,a4 ] }
    }
 }
 B : {
    'cardinality' : { b1:5, b2:1, b3:1 },
    'injection' : { },
    'surjection' : {
       D : { d1 : [ b1 ], d2 : [b2,b3 ] },
    }
 }
}
```

FIG. 30A

```
                                    321
'root' : {
  A : { B : { C : {} } }, D : {} }
  E : {}
}
```

FIG. 30B

```
                                    321
'root' : {
  C : { B : { A : {} } }
  D : { A : {} }
  E : {}
}
```

ANALYSIS METHOD AND COMPUTER

CLAIM OF PRIORITY

The present application claims priority from Japanese patent application JP 2018-144427 filed on Jul. 31, 2018, the content of which is hereby incorporated by reference into this application.

BACKGROUND OF THE INVENTION

1. Field of the Invention

The present invention relates to a yield analysis in manufacturing industries.

2. Description of the Related Art

A semiconductor device and a metal product are manufactured through a number of manufacturing procedures. In a quality inspection of a complete product, a defective product and a good product are determined. The yield analysis is performed to specify a factor causing a defective product, that is, the quality. In the yield analysis, the processes are performed using data associated to a state value measured in the manufacturing procedure, a parameter such as a control value set in the manufacturing procedure, and a value related to the quality.

In the yield analysis, there is a need to specify a parameter or a set of parameters related to a defective product from among a number of parameters with respect to a product.

The product is manufactured under various conditions, and various state values are taken. Therefore, the number of sets of parameters to be analyzed is extremely large. Therefore, there is a need of a method of analyzing a correlation of the parameters with efficiency. A principal component analysis is known as a method of analyzing the correlation of the parameters with efficiency.

SUMMARY OF THE INVENTION

The principal component analysis is performed on an assumption that the value of a parameter is a numerical value. Therefore, in a case where a non-numerical value such as a character string is set in the parameter, the correlation of the parameter is not possible to be specified on the basis of the principal component analysis. In addition, in a case where a cardinality of the parameter is low, and the parameters do not correspond to each other one to one, it is not possible to obtain a useful result in the principal component analysis.

An object of the invention is to perform the yield analysis with efficiency and to improve accuracy.

A representative example of the invention disclosed in the application is as follows. In other words, an analysis method performed by a computer analyzes analysis data acquired from a system which includes a plurality of devices to manufacture a product. The computer includes a calculation device, a storage device connected to the calculation device, and a network interface connected to the calculation device. The analysis data is configured by a plurality of fields to store a parameter related to the manufacturing of the product and at least one field to store an evaluation value indicating a quality of the product. The analysis method includes a first step of managing, by the computer, a set of values of each field of the analysis data as a column, a second step of analyzing, by the computer, a correspondence from a value belonging to a first target column to a value belonging to a second target column to specify a surjection column pair which is a set of the first target column and the second target column, the first target column and the second target column which have a subjective correspondence, a third step of generating, by the computer, graph information to manage a first graph of a tree structure indicating a connection relation of the column by connecting a graph which has nodes of the first target column and the second target column of the surjection column pair, a fourth step of performing, by the computer, a yield analysis to specify the parameter affecting the evaluation value using the graph information.

According to the invention, the yield analysis can be performed with efficiency, and the accuracy can be improved. Objects, configurations, and effects besides the above description will be apparent through the explanation on the following embodiments.

BRIEF DESCRIPTION OF THE DRAWINGS

FIG. 8 is a diagram for describing a notation rule of a data structure of the first embodiment;

FIG. 9 is a diagram illustrating an example of a data structure of a control data management information of the first embodiment;

FIG. 14 is a diagram illustrating an example of a data structure of analysis data management information of the first embodiment;

FIG. 15 is a diagram illustrating an example of a data structure of cardinality information of the first embodiment;

FIG. 16 is a diagram illustrating an example of a data structure of column correspondence information of the first embodiment;

FIG. 17 is a diagram illustrating an example of a data structure of surjection column pair information of the first embodiment;

FIG. 18 is a diagram illustrating an example of a data structure of surjection graph information of the first embodiment;

FIG. 27 is a diagram illustrating an example of the analysis data management information which is input in the column analysis process of the first embodiment;

FIG. 28 is a diagram illustrating an example of the surjection column pair information which is output in the column analysis process of the first embodiment;

FIG. 30A is a diagram illustrating an example of the surjection graph information which is output in the column analysis process of the first embodiment;

FIG. 30B is a diagram illustrating an example of the surjection graph information which is output in the column analysis process of the first embodiment;

DESCRIPTION OF THE PREFERRED EMBODIMENTS

Hereinafter, embodiments of the invention will be described using the drawings. However, the invention is not interpreted in a limited way to the following embodiments. A person skilled in the art can easily understand that the specific configurations may be changed within a scope not departing from the ideas and the spirit of the invention.

The configurations or functions which are identical or similar below in the invention will be attached with the same symbols, and the redundant description will be omitted.

The notations of "first", "second", and "third" in this specification are attached in order to identify the components, but not necessarily used to indicate the number or the order.

First Embodiment

Figure 1:
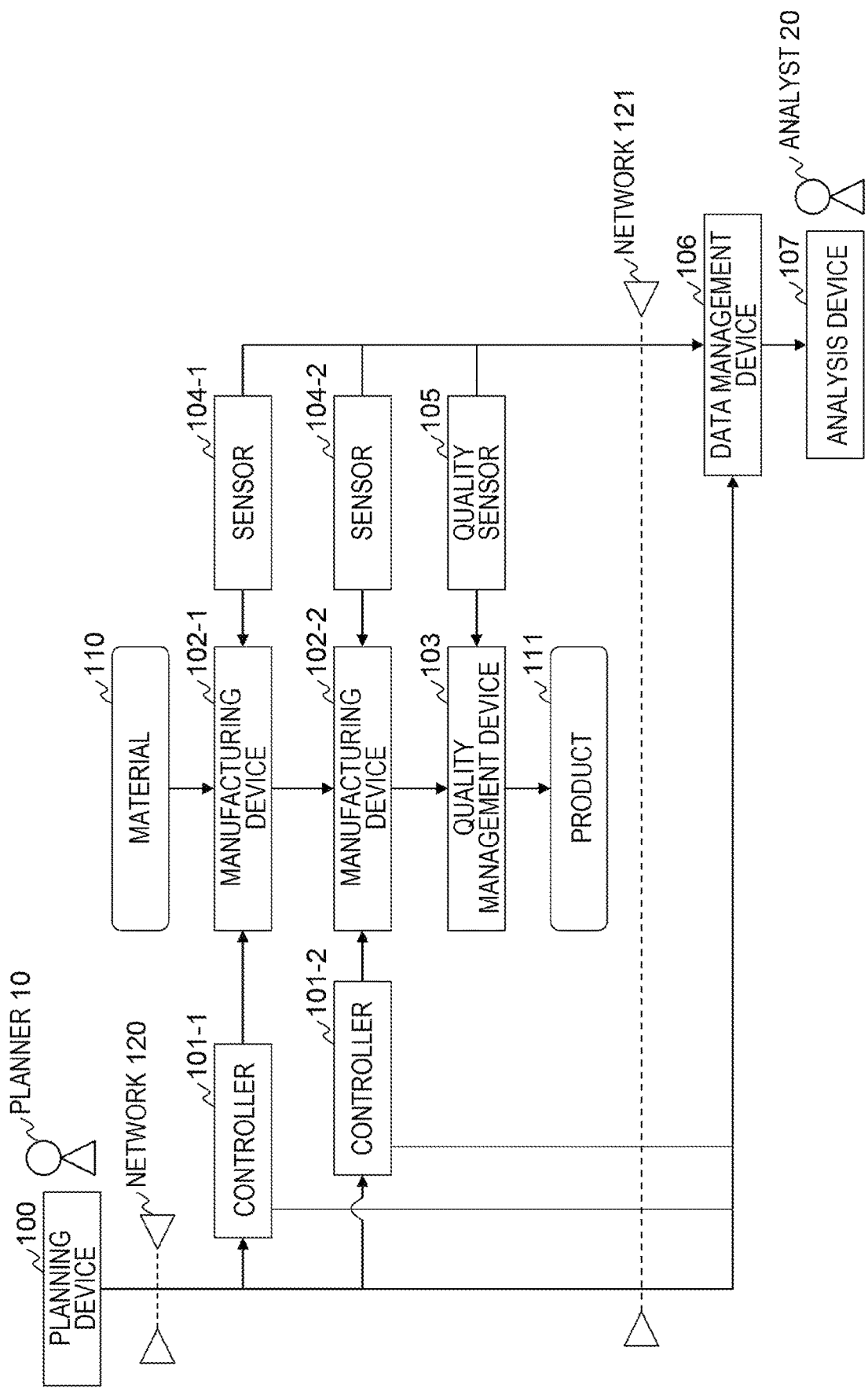
FIG. 1 is a diagram illustrating an exemplary configuration of a system of a first embodiment.

FIG. 1 is a diagram illustrating an exemplary configuration of a system of a first embodiment.

The system of the first embodiment is configured by a planning device 100, a plurality of controllers 101, a plurality of manufacturing devices 102, a quality management device 103, a plurality of sensors 104, a quality sensor 105, a data management device 106, and an analysis device 107. The plurality of controllers 101 include a controller 101-1 and a controller 101-2. The plurality of manufacturing devices 102 include a manufacturing device 102-1 and a manufacturing device 102-2. The plurality of sensors 104 include a sensor 104-1 and a sensor 104-2.

The planning device 100 is connected to the plurality of controllers 101 through a network 120, and is connected to the data management device 106 through the network 120 and a network 121. In addition, the plurality of controllers 101, the plurality of sensors 104, and the quality sensor 105 are connected to the data management device 106 through the network 121.

The network 120 and the network 121 include a Wide Area Network (WAN) and a Local Area Network (LAN). In addition, a connection method of the network 120 and the network 121 may be a wired or wireless manner.

In the first embodiment, it is assumed a system to which the planning device 100 and the data management device 106 are connected. The planning device 100 and the data management device 106 are accessible to a factory where a product 111 is manufactured from a material 110.

The planning device 100 generates control data to control the manufacturing device 102, and transmits the control data to the controller 101. The planning device 100 is a computer which includes a CPU, a memory, and a network interface. Further, the planning device 100 may be realized using a virtual computer.

A planner 10 makes a manufacturing plan of the product 111 and an operation plan of the manufacturing device 102 using the planning device 100.

The controller 101 controls the manufacturing device 102. For example, the controller 101 sets parameters to control the operation of the manufacturing device 102 to the manufacturing device 102. The controller 101 is a computer which includes a CPU, a memory, and a network interface. In addition, the controller 101 may be realized using dedicated hardware to control the manufacturing device 102. Further, the controller 101 may be realized using the virtual computer.

The sensor 104 measures a value indicating a machining state of the material 110 and a value indicating a state of the manufacturing device 102. In addition, the sensor 104 transmits a measured value to the data management device 106.

The quality sensor 105 measures an evaluation value which is a value to evaluate the quality of the completed product 111. In addition, the quality sensor 105 transmits the measured evaluation value to the data management device 106. Further, the quality sensor 105 may be connected to each of the plurality of manufacturing devices 102 in order to measure the evaluation value related to the quality of an intermediate product.

The data management device 106 manages data related to the manufacturing of the product 111. The configuration of the data management device 106 will be described using FIG. 2.

The analysis device 107 performs a yield analysis of the product 111. The configuration of the analysis device 107 will be described using FIG. 3. An analyst 20 performs the yield analysis of the product 111 using the analysis device 107 at any timing.

Figure 2:
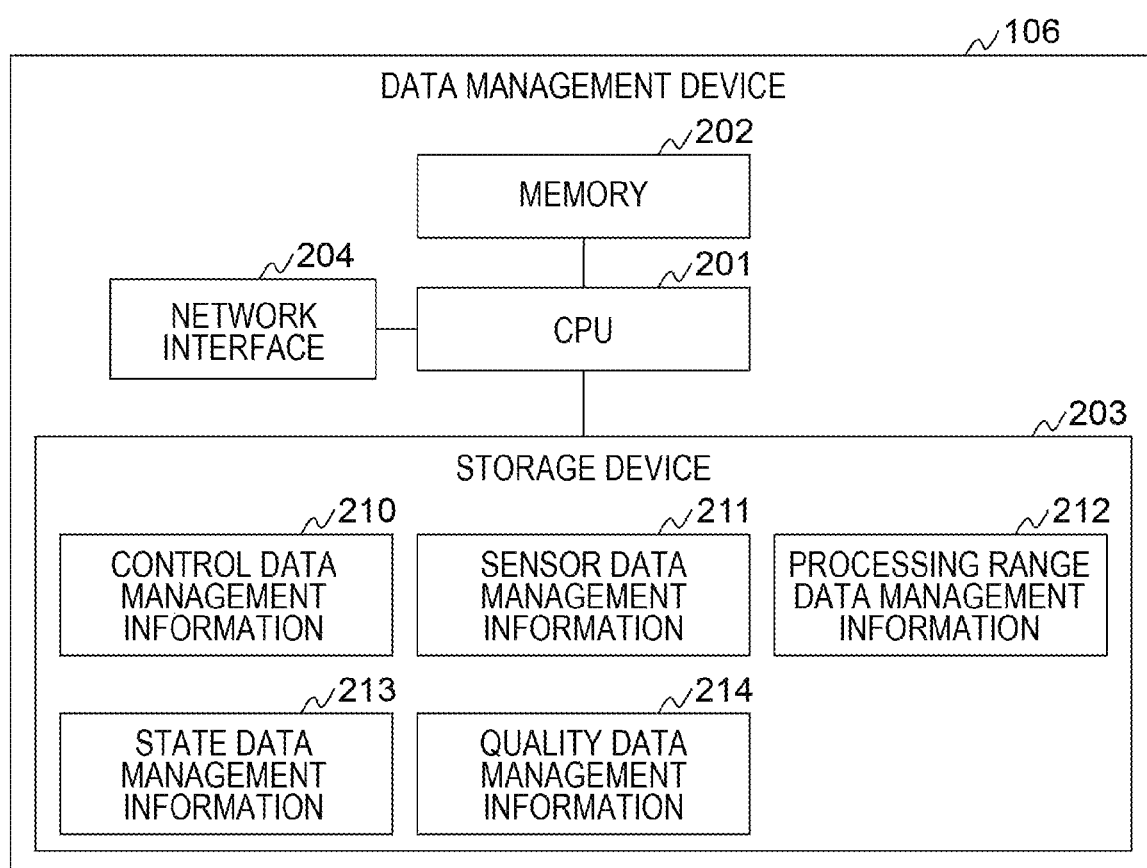
FIG. 2 is a diagram illustrating an example of a configuration of a data management device of the first embodiment.

FIG. 2 is a diagram illustrating an example of the configuration of the data management device 106 of the first embodiment.

The data management device 106 is a CPU 201, a memory 202, a storage device 203, and a network interface 204 as hardware configurations. The respective hardware configurations are connected through an internal bus.

The CPU 201 performs a program which is stored in the memory 202. The CPU 201 performs a process according to the program to operate as a functional unit (module) which realizes a specific function. In the following description, in a case where a process is described with the functional unit as a subject, it indicates that the CPU performs the program which realizes the functional unit.

The memory 202 stores the program performed by the CPU 201 and data which is used by the program. The memory 202 stores the program which realizes the functional unit (not illustrated) to manage data.

The storage device 203 is a Hard Disk Drive (HDD) and a Solid State Drive (SSD), and stores data permanently. The data stored in the storage device 203 will be described below. The program stored in the memory 202 may be stored in the storage device 203. In a case where the program is performed, the CPU 201 reads out the program from the storage device 203, loads the program to the memory 202, and performs the loaded program in the memory 202. In addition, the data stored in the storage device 203 may be stored in the memory 202.

The network interface 204 is an interface to communicate with other devices through the network.

Herein, the data stored in the storage device 203 will be described. The storage device 203 stores control data management information 210, sensor data management information 211, processing range data management information 212, state data management information 213, and quality data management information 214.

The control data management information 210 stores the control data to control the manufacturing device 102. The control data includes, for example, a parameter such as temperature and pressure which are set to the manufacturing device 102. The data structure of the control data management information 210 will be described using FIG. 9.

The sensor data management information 211 stores sensor data which includes a value indicating the machining state of the material 110 measured by the sensor 104. The data structure of the sensor data management information 211 will be described using FIG. 10.

The processing range data management information 212 stores processing range data. The processing range data is data indicating a time range to acquire time series data related to the product 111 for every type from the sensor data which is acquired from the sensor 104 connected to the manufacturing device 102 which manufactures a plural types of products 111. The data structure of the processing range data management information 212 will be described using FIG. 11.

The state data management information 213 stores state data which includes a value indicating the state of the manufacturing device 102 measured by the sensor 104. The data structure of the state data management information 213 will be described using FIG. 12.

The quality data management information 214 stores quality data which includes the evaluation value indicating the quality of the product 111 measured by the quality sensor 105. The data structure of the quality data management information 214 will be described using FIG. 13.

Figure 3:
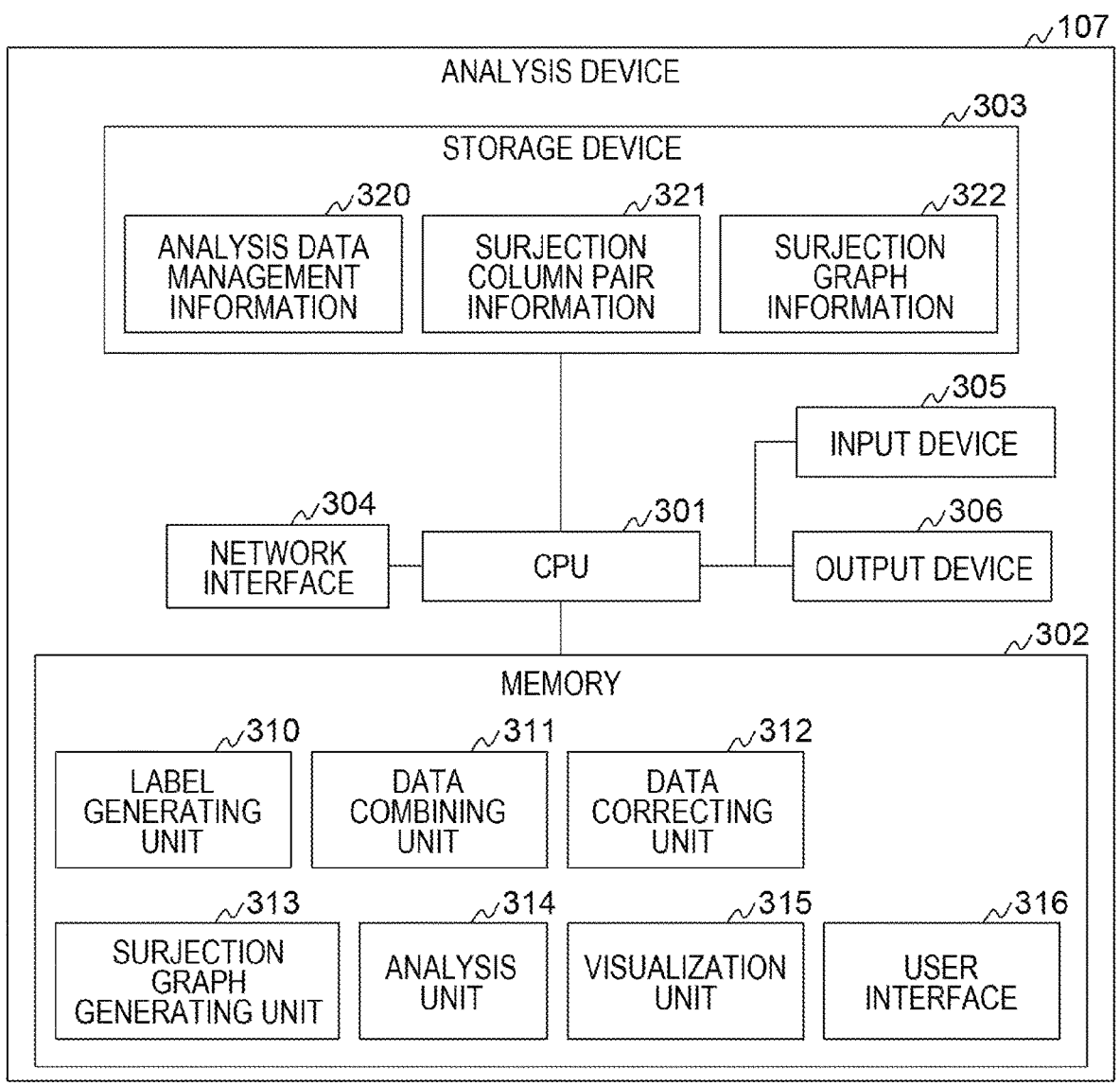
FIG. 3 is a diagram illustrating an example of a configuration of an analysis device of the first embodiment.

FIG. 3 is a diagram illustrating an example of the configuration of the analysis device 107 of the first embodiment.

The analysis device 107 includes a CPU 301, a memory 302, a storage device 303, a network interface 304, an input device 305, and an output device 306. The respective hardware configurations are connected through an internal bus.

The CPU 301, the memory 302, the storage device 303, and the network interface 304 are the same hardware configuration as those of the CPU 201, the memory 202, the storage device 203, and the network interface 204.

The input device 305 is a device to input data such as a keyboard, a mouse, and a touch panel. The output device 306 is a device to output data such as a display and a printer.

Herein, the data stored in the storage device 303 and the program stored in the memory 302 will be described.

The storage device 303 stores analysis data management information 320, surjection column pair information 321, and surjection graph information 322.

The analysis data management information 320 stores analysis data to which data related to the manufacturing of the product 111 is combined. The analysis data is data to be used in the yield analysis, and is configured by a field group in which a value related to the manufacturing of the product 111 is stored. The data structure of the analysis data management information 320 will be described using FIG. 14.

The surjection column pair information 321 is mapping information which indicates correspondence between a set (column) of values of one field of the analysis data and a set (column) of values of another field, and is used to manage a combination of sets in which the mapping becomes surjective or bijective. The data structure of the surjection column pair information 321 will be described using FIG. 17.

In the following description, a combination of columns of which the correspondence therebetween becomes bijective is denoted by a bijection column pair. A combination of columns which have a surjective correspondence is denoted by a surjection column pair. Further, in a case where a combination is denoted by a column pair, it simply indicates a combination of columns.

The surjection graph information 322 is information to manage a tree structure of graph which is generated by linking the columns on the basis of the surjection column pair information 321. The data structure of the surjection graph information 322 will be described using FIG. 18. Further, the graph of columns is configured by nodes (columns) and edges which connect the columns which have the surjective correspondence.

The memory 302 stores a program which realizes a label generating unit 310, a data combining unit 311, a data correcting unit 312, a surjection graph generating unit 313, an analysis unit 314, a visualization unit 315, and a user interface 316.

The label generating unit 310 generates label sensor data from the sensor data which is time series data. The label sensor data is formatted to be combined with the state data.

The data combining unit 311 combines the data managed by the data management device 106 to generate the analysis data. In addition, the data combining unit 311 registers the analysis data in the analysis data management information 320.

The data correcting unit 312 corrects or processes the analysis data in various types of processes.

The surjection graph generating unit 313 retrieves the bijection column pair and the surjection column pair to generate the surjection column pair information 321, and generates the surjection graph information 322 on the basis of the surjection column pair information 321.

The analysis unit 314 performs the yield analysis on the basis of the surjection graph information 322.

The visualization unit 315 generates the display information to present various types of data to the user.

The user interface 316 displays the information to the user, and provides an interface to receive a user's input.

Further, the respective functional units of the analysis device 107 may be configured by integrating a plurality of functional units into one functional unit, or may configured by dividing one functional unit into a plurality of functional units according to functions.

Figure 4:
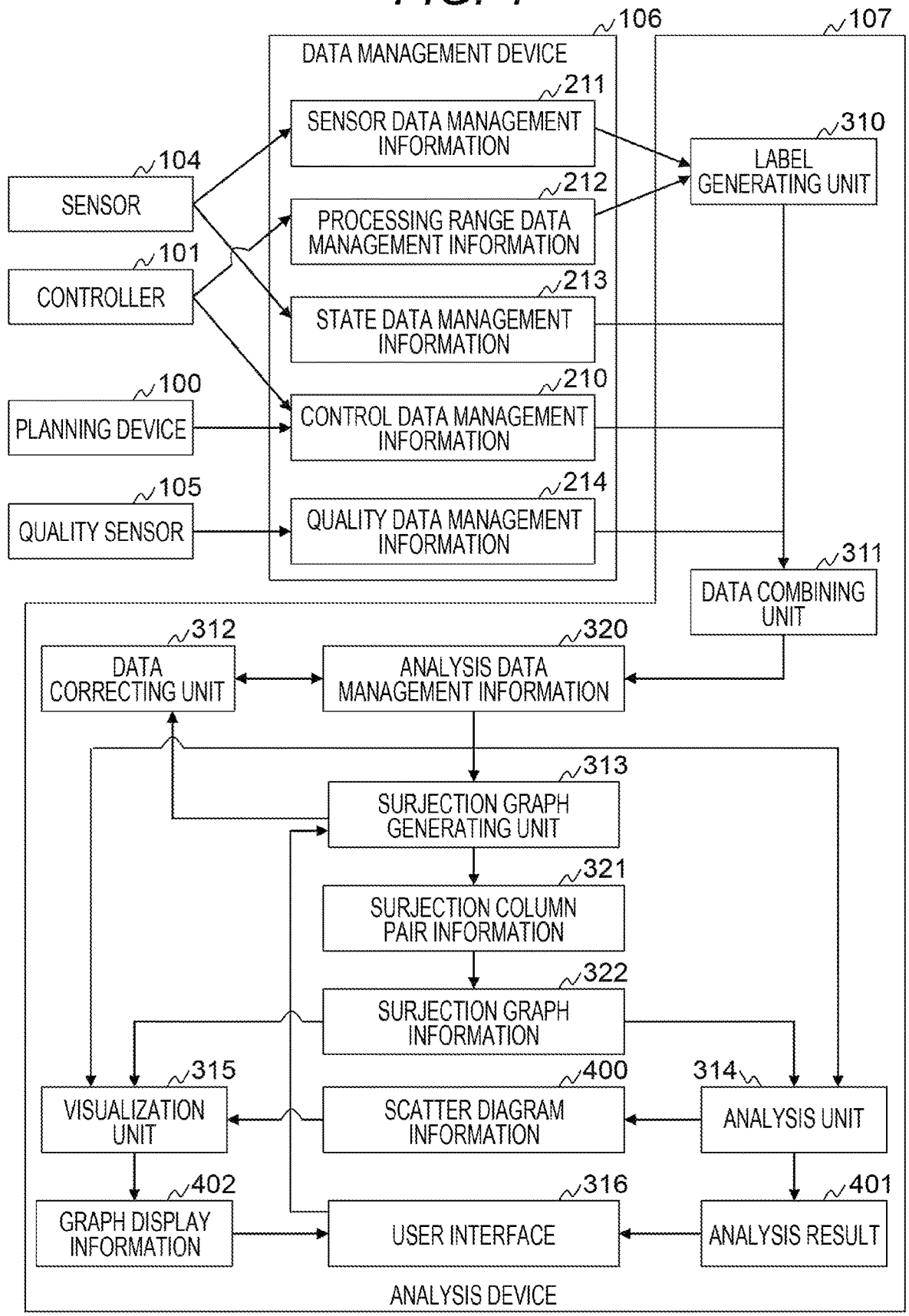
FIG. 4 is a diagram for describing a relation between a module and data in the entire system of the first embodiment.

FIG. 4 is a diagram for describing a relation between modules and data of the entire system of the first embodiment.

The data management device 106 acquires the sensor data and the state data from the sensor 104, acquires the processing range data and the control data from the controller 101, acquires the control data from the planning device 100, and acquires the quality data from the quality sensor 105. The data management device 106 stores the acquired data in the storage device 203.

The analysis device 107 acquires, at an arbitrary timing, the control data management information 210, the sensor data management information 211, the processing range data management information 212, the state data management information 213, and the quality data management information 214 which are managed by the data management device 106.

The label generating unit 310 of the analysis device 107 generates the label sensor data on the basis of the sensor data and the processing range data, and outputs the label sensor data to the data combining unit 311.

The data combining unit 311 combines the control data, the state data, the label sensor data, and the quality data to generate the analysis data. In addition, the data combining unit 311 stores the generated analysis data in the analysis data management information 320.

The surjection graph generating unit 313 acquires the analysis data from the analysis data management information 320, extracts the correspondence between the columns of the analysis data, and specifies a column pair of which the correspondence becomes surjective or bijective. The surjection graph generating unit 313 generates the surjection column pair information 321 on the basis of the specified column pair. Further, the surjection graph generating unit 313 generates the surjection graph information 322 on the basis of the surjection column pair information 321. In addition, the surjection graph generating unit 313 outputs a correct instruction of the analysis data to the data correcting unit 312 on the basis of its own instruction or a user's instruction through the user interface 316.

In a case where the correct instruction of the analysis data is received, the data correcting unit 312 corrects the analysis data according to the instruction.

The analysis unit 314 generates the information of a graph (scatter diagram) on the basis of the analysis data management information 320 as scatter diagram information 400. The graph plots the analysis unit in a feature space which has a field (evaluation value) of the quality data as an axis. The analysis unit 314 outputs the scatter diagram information 400 to the visualization unit 315 at an arbitrary timing. In addition, the analysis unit 314 performs the yield analysis on the basis of the analysis data management information 320, the surjection graph information 322, and the scatter diagram information 400, and generates the analysis result 401.

The visualization unit 315 generates graph display information 402 on the basis of the surjection graph information 322 and the scatter diagram information 400.

The user interface 316 displays a screen on the basis of the graph display information 402, and displays a screen on the basis of the analysis result 401. In addition, the user interface 316 receives the correct instruction of the analysis data and the correct instruction of a parameter which is set to the surjection graph generating unit 313.

Figure 5:
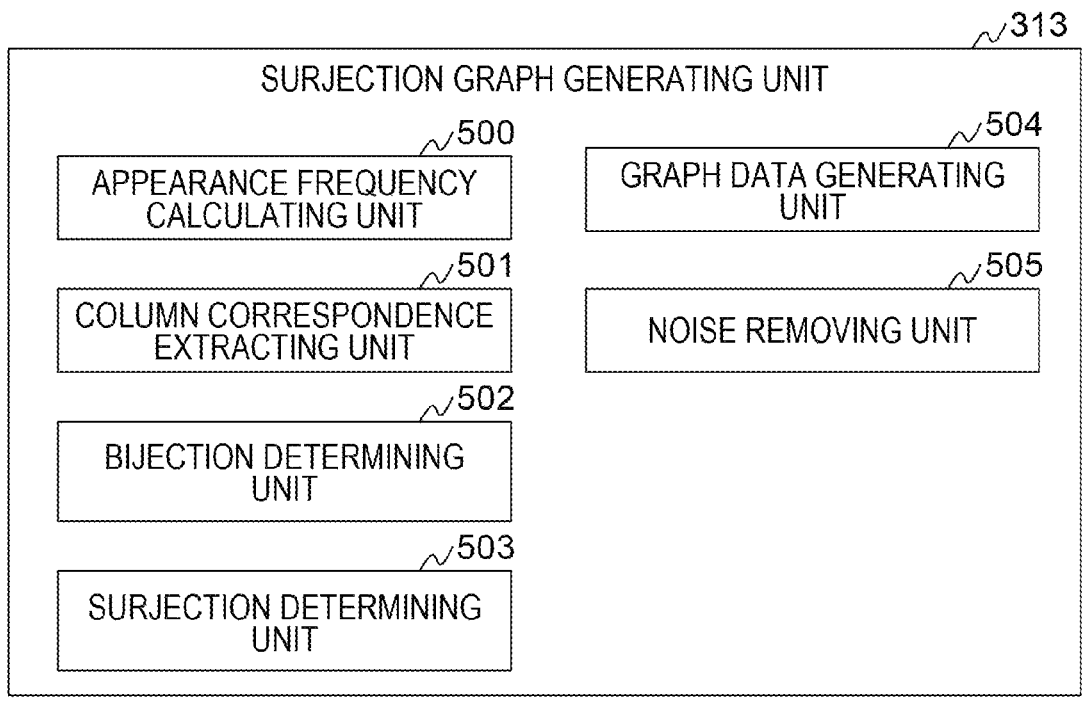
FIG. 5 is a diagram for describing a detail configuration of a surjection graph generating unit of the first embodiment.

FIG. 5 is a diagram for describing a detail configuration of the surjection graph generating unit 313 of the first embodiment.

The surjection graph generating unit 313 includes an appearance frequency calculating unit 500, a column correspondence extracting unit 501, a bijection determining unit 502, a surjection determining unit 503, a graph data generating unit 504, and a noise removing unit 505.

The appearance frequency calculating unit 500 calculates an appearance frequency of the value of a column. The appearance frequency calculating unit 500 outputs the calculation result as cardinality information 1500. The data structure of the cardinality information 1500 will be described using FIG. 15.

The column correspondence extracting unit 501 extracts a correspondence between two columns. The column correspondence extracting unit 501 outputs the extraction result of the correspondence as column correspondence information 1600. The data structure of the column correspondence information 1600 will be described using FIG. 16.

The bijection determining unit 502 retrieves the bijection column pair on the basis of the column correspondence information 1600. The surjection determining unit 503 extracts the surjection column pair on the basis of the column correspondence information 1600. The surjection graph generating unit 313 generates the surjection column pair information 321 on the basis of the extraction result of the bijection column pair and the surjection column pair.

The graph data generating unit 504 generates the surjection graph information 322 on the basis of the surjection column pair information 321.

The noise removing unit 505 removes a value which acts as a noise from the values of the columns in a case where the column pair is extracted.

Figure 6:
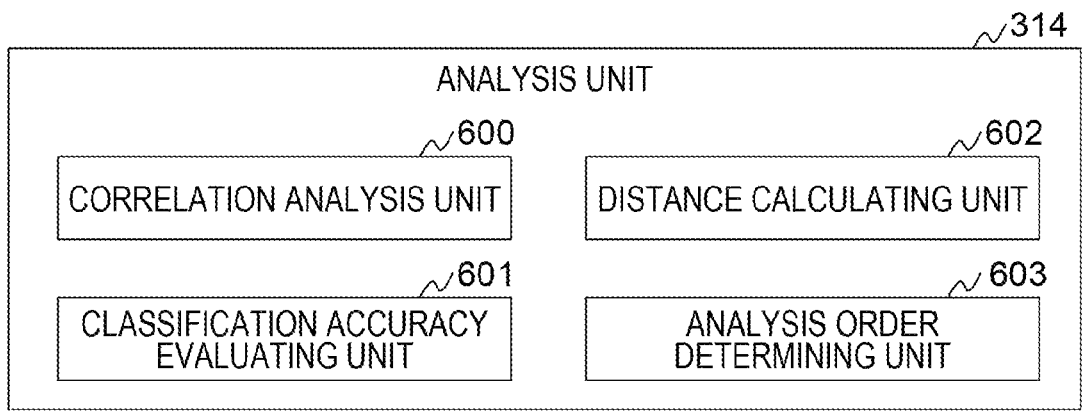
FIG. 6 is a diagram for describing a detail configuration of an analysis unit of the first embodiment.

FIG. 6 is a diagram for describing a detail configuration of the analysis unit 314 of the first embodiment.

The analysis unit 314 includes a correlation analysis unit 600, a classification accuracy evaluating unit 601, a distance calculating unit 602, and an analysis order determining unit 603.

The correlation analysis unit 600 generates the scatter diagram information 400 to manage the location of the analysis data in the feature space which has the evaluation value as an axis.

The classification accuracy evaluating unit 601 calculates a value indicating the analysis accuracy on the basis of the surjection column pair information 321 and the scatter diagram information 400 in a case where the analysis data in the feature space is classified by paying attention to an arbitrary column.

The distance calculating unit 602 calculates a distance between columns in the tree structure of graph.

The analysis order determining unit 603 determines a processing number of a combination of the column to analyze the correlation in the yield analysis on the basis of the surjection column pair information 321, a value indicating a classification accuracy, and a distance of the column in structure data.

Figure 7:
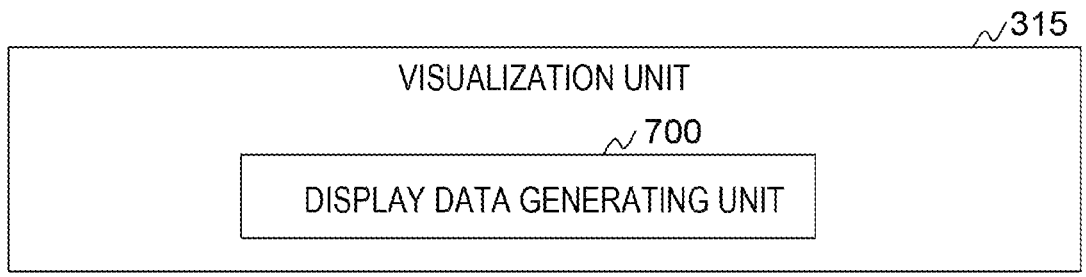
FIG. 7 is a diagram for describing a detail configuration of a visualization unit of the first embodiment.

FIG. 7 is a diagram for describing a detail configuration of the visualization unit 315 of the first embodiment.

The visualization unit 315 includes a display data generating unit 700. The display data generating unit 700 generates the graph display information 402 on the basis of the scatter diagram and the surjection graph information 322.

Next, the data structure of data which is handled in the system will be described. First, the notation of the data structure used in this specification will be described.

FIG. 8 is a diagram for describing a notation rule of the data structure of the first embodiment.

In the first embodiment, the description will be given about a JSON data structure as an example. Then, the following notation rule is applied.

Rule 1 indicates the notation rule of an array. Since an array having elements of a set as values is used in the first embodiment, a notation 800 is denoted as a notation 801 using a label of a set. The uppercase letter indicates a symbol of a set, and the lowercase letter indicates an element of the set. Further, a symbol indicating a subset will be denoted using the same letter as the set in this specification.

Rule 2 indicates a notation rule of an object. In the notation rule of the object, the notation 810 is also denoted as the notation 811 using the label of the set.

Rule 3 and Rule 4 indicate the notation rules in which Rule 1 and Rule 2 are combined.

Next, the data structure of data and information will be described using FIGS. 9 to 18.

FIG. 9 is a diagram illustrating an example of the data structure of the control data management information 210 of the first embodiment.

The control data management information 210 stores the control data which is configured by an FID 901, a PID 902, a temperature 903, and a pressure 904.

The FID 901 is a field to store identification information of the manufacturing device 102. The PID 902 is a field to store the identification information of the product 111. The temperature 903 and the pressure 904 are fields to store values of the parameters to control the manufacturing device 102.

Figure 10:
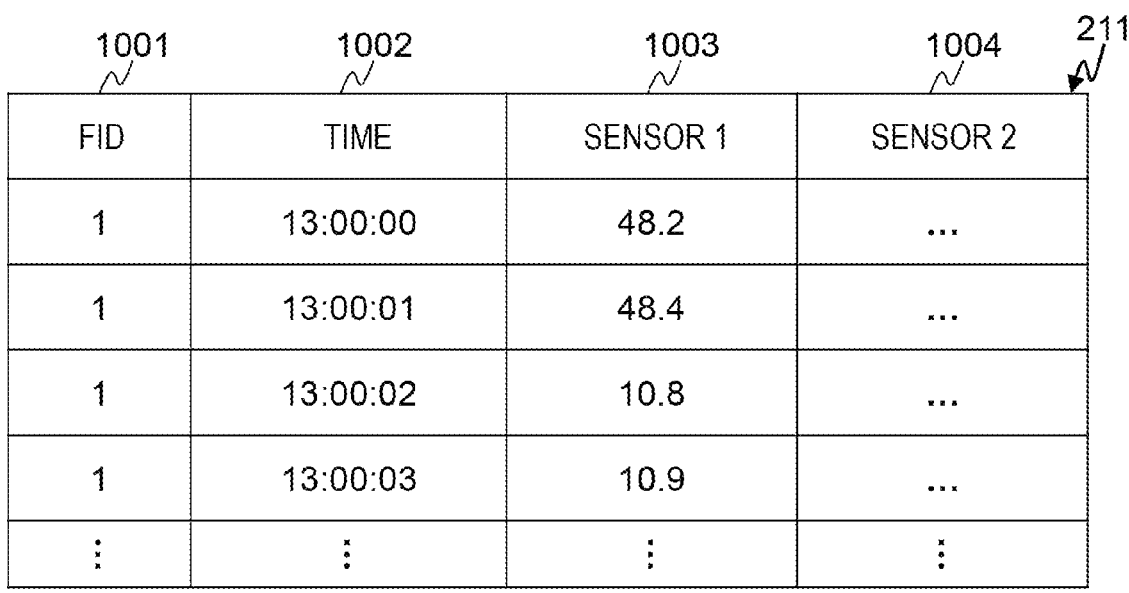
FIG. 10 is a diagram illustrating an example of a data structure of sensor data management information of the first embodiment.

FIG. 10 is a diagram illustrating an example of the data structure of the sensor data management information 211 of the first embodiment.

The sensor data management information 211 stores the sensor data which is configured by an FID 1001, a time 1002, Sensor 1 (1003), and Sensor 2 (1004). The FID 1001 is the same field as the FID 901.

The time 1002 is a field to store a time (time stamp) at which the value included in the sensor data is measured.

Sensor 1 (1003) is a field to store the value which is measured by the sensor 104-1. Sensor 2 (1004) is a field to store the value which is measured by the sensor 104-2.

Further, in a case where the sensors 104 measure different type of values, the sensor data includes fields to store the respective values. Further, in a case where the sensors 104 measures values at different intervals, the sensor data management information 211 may be stored in each sensor 104.

Figure 11:
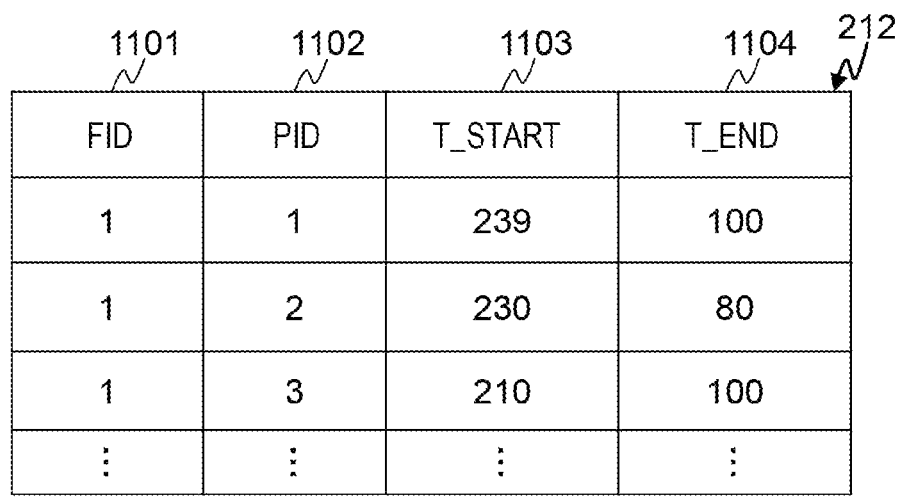
FIG. 11 is a diagram illustrating an example of a data structure of processing range data management information of the first embodiment.

FIG. 11 is a diagram illustrating an example of the data structure of the processing range data management information 212 of the first embodiment.

The processing range data management information 212 stores the processing range data which is configured by an FID 1101, a PID 1102, a T_START 1103, and a T_END 1104. The FID 1101 and the PID 1102 are the same field as the FID 901 and the PID 902.

The T_START 1103 is a field which stores a time indicating a starting point of a range cut out the value related to the product 111 corresponding to the PID 1102 from the sensor data which is acquired from the manufacturing device 102 corresponding to the FID 1101. The T_END 1104 is a field which stores a time indicating an ending point of a range cut out the value related to the product 111 corresponding to the PID 1102 from the sensor data which is acquired from the manufacturing device 102 corresponding to the FID 1101.

Figure 12:
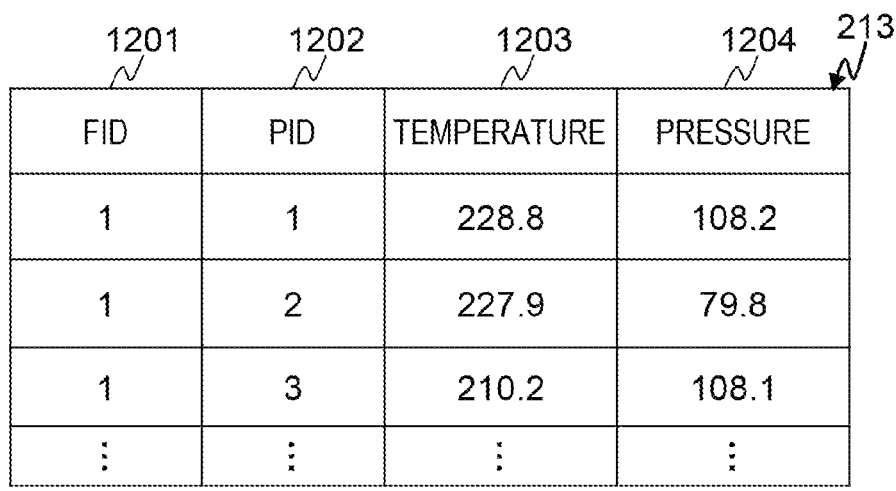
FIG. 12 is a diagram illustrating an example of a data structure of state data management information of the first embodiment.

FIG. 12 is a diagram illustrating an example of the data structure of state data management information 213 of the first embodiment.

The state data management information 213 stores the state data which is configured by an FID 1201, a PID 1202, a temperature 1203, and a pressure 1204. The FID 1201 and the PID 1202 are the same field as the FID 901 and the PID 902.

The temperature 1203 and the pressure 1204 are fields to store measurement values of the parameters to control the manufacturing device 102.

Figure 13:
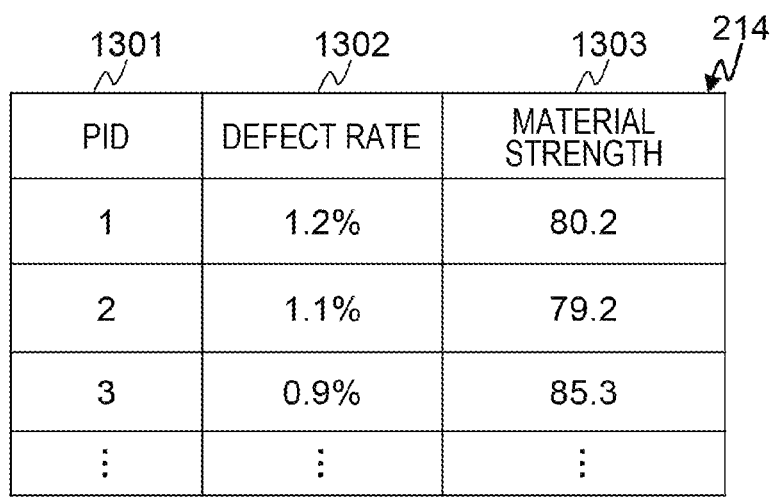
FIG. 13 is a diagram illustrating an example of a data structure of quality data management information of the first embodiment.

FIG. 13 is a diagram illustrating an example of the data structure of quality data management information 214 of the first embodiment.

The quality data management information 214 stores the quality data which is configured by a PID 1301, a defect rate 1302, and a material strength 1303. In the quality data management information 214 illustrated in FIG. 13, the quality data of a unit of product is stored. The PID 1301 is the same field as the PID 902.

The defect rate 1302 and the material strength 1303 are fields to store the evaluation values of the product 111. Specifically, the defect rate 1302 is a field to store a ratio of the products 111 which are determined as defective products. The material strength 1303 is a field to store a strength of the product 111.

FIG. 14 is a diagram illustrating an example of the data structure of analysis data management information 320 of the first embodiment.

The analysis data management information 320 stores the analysis data which is configured by a PID 1401, control data 1402, state data 1403, and quality data 1404. The analysis data management information 320 illustrated in FIG. 14 stores the analysis data in a unit of the product 111. The PID 1401 is the same field as the PID 902.

The control data 1402 is a field to store the control data related to the product 111 corresponding to the PID 1401. In the control data 1402, the control data acquired from the planning device 100 and the plurality of controllers 101 is stored.

The state data 1403 is a field to store the state data related to the product 111 corresponding to the PID 1401. In the state data 1403, the state data acquired from the plurality of sensors 104 is stored.

The quality data 1404 is a field to store the quality data related to the product 111 corresponding to the PID 1401.

A row 1410 indicates one piece of analysis data. A column 1411 is a set of values of a specific field, that is, a column. In the column, an attribute name of the value stored in the field is set as a column name. One column forms one or more categories.

FIG. 15 is a diagram illustrating an example of the data structure of cardinality information 1500 of the first embodiment.

The cardinality information 1500 is information to manage the category of each column and the appearance frequency of a value belonging to the category.

For example, the data structure of the cardinality information 1500 may be defined as denoted in a schema 1501. The cardinality information 1500 defined in the schema 1501 includes data associated with the appearance frequency of the category of the column and the value belonging to the category with respect to each column name. A sample 1502 indicates a specific example of the cardinality information 1500.

FIG. 16 is a diagram illustrating an example of the data structure of column correspondence information 1600 of the first embodiment.

The column correspondence information 1600 is information to manage the correspondence from the category of the column to the category of the other column.

For example, the data structure of the column correspondence information 1600 may be defined as denoted in a schema 1601. The column correspondence information 1600 defined in the schema 1601 includes data which has the value of Column A as a key and has the set of Column B corresponding to the key as a reference value. A sample 1602 indicates a specific example of the column correspondence information 1600.

FIG. 17 is a diagram illustrating an example of the data structure of surjection column pair information 321 of the first embodiment.

The surjection column pair information 321 is information to manage the bijection column pair and the surjection column pair. For example, the data structure of the surjection column pair information 321 may be defined as denoted in a schema 1701.

The surjection column pair information 321 defined in the schema 1701 includes a data group of a unit of column. The data group of a unit of column includes data indicating the appearance frequency of the value of each category of the column, data indicating the column and the other columns of the bijection column pair, and data indicating the column and the other columns of the surjection column pair. A sample 1702 indicates a specific example of the surjection column pair information 321.

FIG. 18 is a diagram illustrating an example of a data structure of surjection graph information 322 of the first embodiment.

The surjection graph information 322 is information to manage a tree structure of graph which indicates a relation of the surjection or bijection of the columns. For example, the data structure of the surjection graph information 322 may be defined as denoted in a schema 1801.

The surjection graph information 322 defined in the schema 1801 indicates a graph of the column which has the root node as the highest node. The node of the graph of column is assigned with the name of the column. A sample 1802 illustrates a specific example of the surjection graph information 322.

Next, the process of performing the analysis device 107 will be described.

First, an updating process of the analysis data management information 320 performed by the analysis device 107 will be described. The analysis device 107 performs the updating process of the analysis data management information 320 when received an instruction from the analyst 20 or in synchronization therewith.

The analysis device 107 acquires the sensor data management information 211, the processing range data management information 212, the state data management information 213, the control data management information 210, and the quality data management information 214 from the data management device 106. The label generating unit 310 of the analysis device 107 performs the process illustrated in FIG. 19 in a case where various types of information are acquired. With this process, it is possible to convert the sensor data into the label sensor data of a format of combining with other data.

The data combining unit 311 of the analysis device 107 combines the control data, the state data, and the label sensor data which are matched in the combination of the FID and the PID, and combines the quality data which is matched with the PID of the data combined with the PID 1301 so as to generate the analysis data. The data combining unit 311 stores the generated analysis data in the analysis data management information 320.

Figure 19:
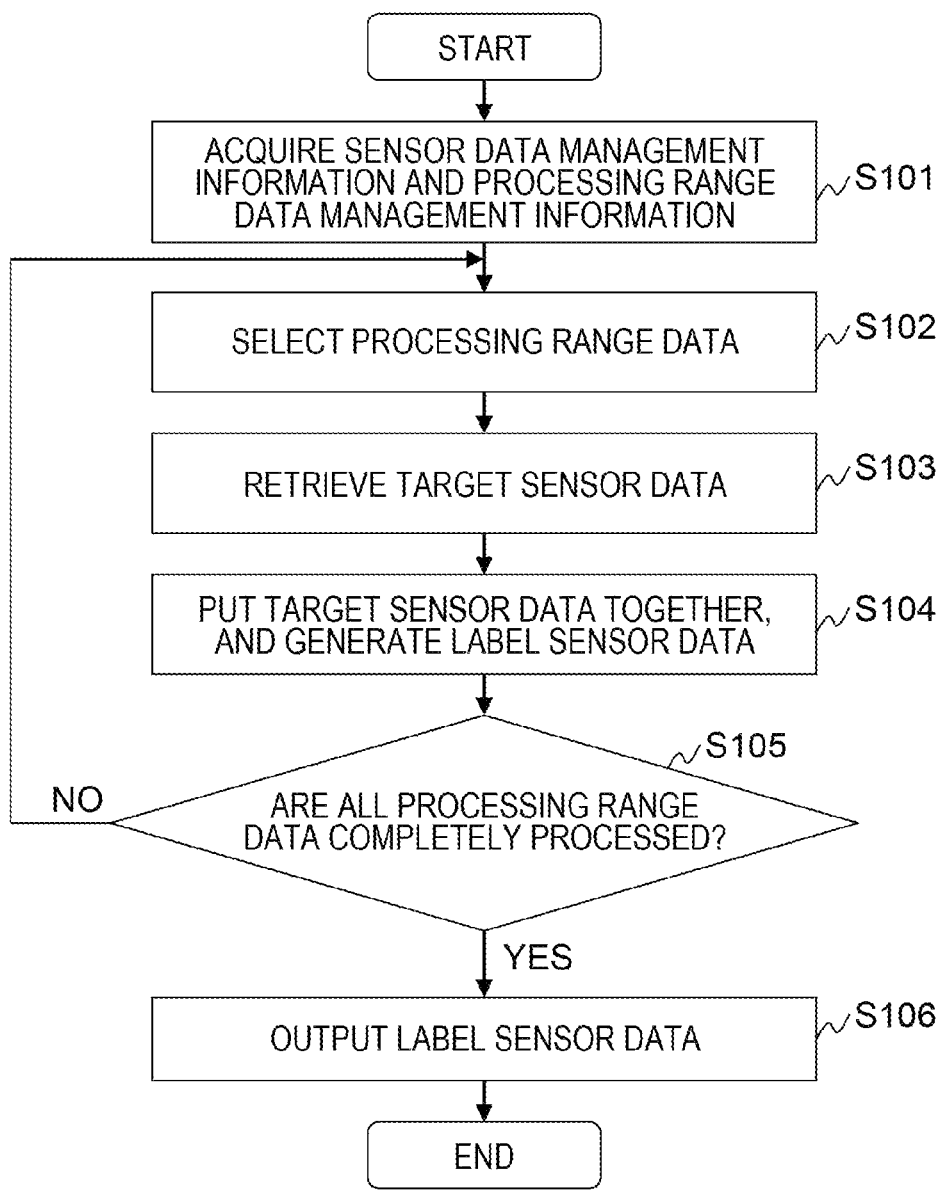
FIG. 19 is a flowchart for describing an example of a process which is performed by a label generating unit of the analysis device of the first embodiment.

FIG. 19 is a flowchart for describing an example of a process which is performed by a label generating unit 310 of the analysis device 107 of the first embodiment.

The label generating unit 310 acquires the sensor data management information 211 and the processing range data management information 212 (Step S101).

Next, the label generating unit 310 selects one piece of processing range data from the processing range data management information 212 (Step S102). For example, the label generating unit 310 selects the processing range data in an order from the top of the processing range data management information 212.

Next, the label generating unit 310 retrieves the target sensor data to be processed with reference to the sensor data management information 211 on the basis of the selected processing range data (Step S103).

Specifically, the label generating unit 310 retrieves the sensor data in which the FID 1001 is matched with the FID 1101 of the selected processing range data, and the time 1002 falls within a time range designated by the T_START 1103 and the T_END 1104.

Next, the label generating unit 310 puts the target sensor data together to generate the label sensor data (Step S104).

For example, the following process is performed. The label generating unit 310 calculates an average value of each of Sensor 1 (1003) and Sensor 2 (1004) of the target sensor data. The label generating unit 310 generates the label sensor data which is configured by the FID, the PID, and the fields of Sensor 1 and Sensor 2. The label generating unit 310 sets the FID 1101 to the FID, and sets the PID 1102 to the PID. In addition, the label generating unit 310 sets the average value to each field of Sensor 1 and Sensor 2.

Further, a method of putting the sensor data together is not limited to the above configuration. For example, a maximum value or a minimum value may be set to the field.

Next, the label generating unit 310 determines whether all the processing range data registered in the processing range data management information 212 is processed (Step S105).

In a case where the processes of all the processing range data registered in the processing range data management information 212 are not completed, the label generating unit 310 returns to Step S102, and performs the same process.

In a case where the processes of all the processing range data registered in the processing range data management information 212 are completed, the label generating unit 310 outputs the generated label sensor data to the data combining unit 311 (Step S106). Thereafter, the label generating unit 310 ends the process. Further, in the first embodiment, the label sensor data is output as the state data.

Next, the description will be given about a column analysis process which is performed by the analysis device 107 to generate the surjection column pair information 321 and the surjection graph information 322.

Figure 20:
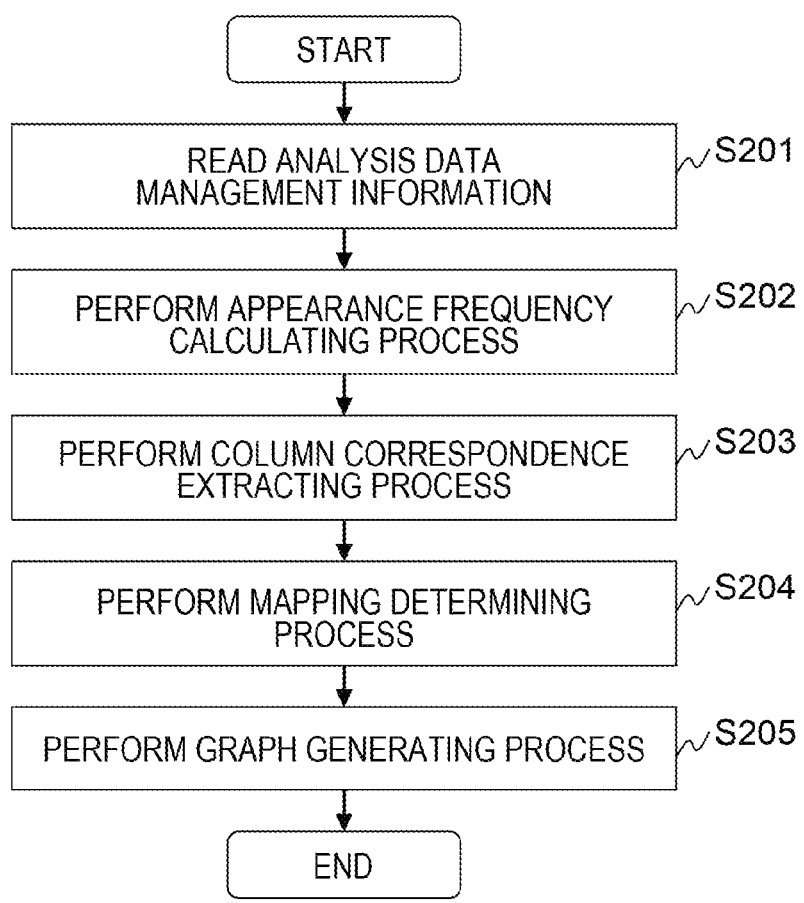
FIG. 20 is a flowchart for describing an example of a column analysis process which is performed by the analysis device of the first embodiment.

FIG. 20 is a flowchart for describing an example of a column analysis process which is performed by the analysis device 107 of the first embodiment.

The analysis device 107 reads out the analysis data management information 320 which is stored in the storage device 303 (Step S201).

Next, the analysis device 107 performs an appearance frequency calculating process to generate the cardinality information 1500 (Step S202). The details of the appearance frequency calculating process will be described using FIG. 21.

Next, the analysis device 107 performs a column correspondence extracting process to generate the column correspondence information 1600 (Step S203). The details of the column correspondence extracting process will be described using FIG. 22.

Next, the analysis device 107 performs a mapping determining process to generate the surjection column pair information 321 (Step S204). The details of the mapping determining process will be described using FIG. 23.

Next, the analysis device 107 performs a graph generating process to generate the surjection graph information 322 (Step S205). The details of the graph generating process will be described using FIG. 26.

Figure 21:
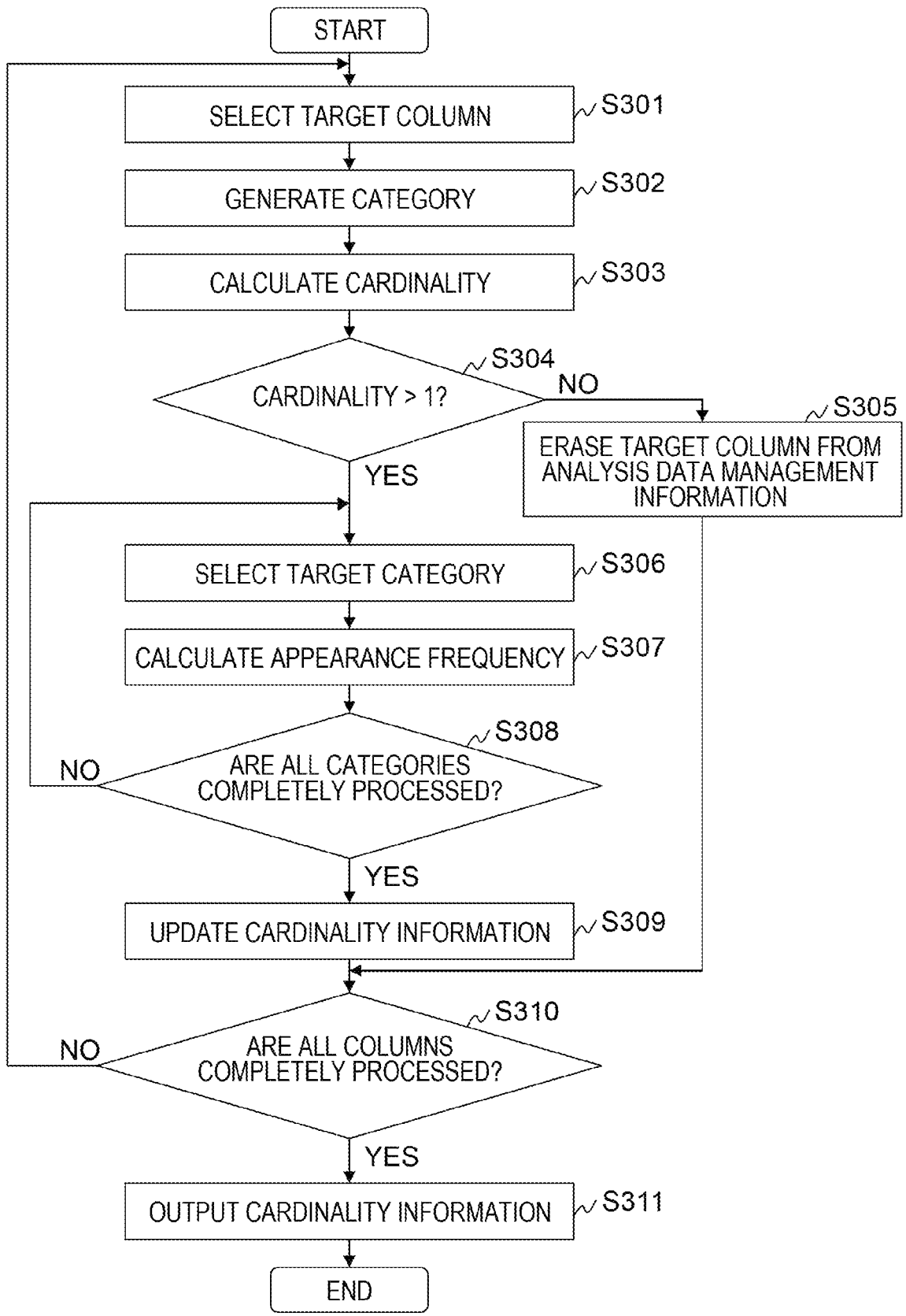
FIG. 21 is a flowchart for describing an example of an appearance frequency calculating process which is performed by the analysis device of the first embodiment.

FIG. 21 is a flowchart for describing an example of an appearance frequency calculating process which is performed by the analysis device 107 of the first embodiment.

The surjection graph generating unit 313 selects a target column from the columns of the analysis data management information 320 (Step S301).

Next, the surjection graph generating unit 313 generates the category of the target column (Step S302).

Specifically, the surjection graph generating unit 313 analyzes the type of the value of the target column to generate the category of the target column. For example, in a case where the values of the columns are "a1, a1, a2, a3, a3, a4, a4, a4", the category of the target column becomes "a1", "a2", "a3", and "a4".

Further, in a case where the value stored in the target column is an analogue value, the type of the value is significantly increased. Therefore, in a case where the value stored in the target column is an analogue value, the surjection graph generating unit 313 sets a range of the values and generates a category on the basis of the range of the values. For example, a range of equal to or more than 10 and less than 20 is set for the category "a1".

Next, the surjection graph generating unit 313 calculates a cardinality of the target column (Step S303).

Specifically, the surjection graph generating unit 313 calculates the number of categories as the cardinality. Further, the cardinality is a value of 1 or more.

Next, the surjection graph generating unit 313 determines whether the cardinality is 1 or more (Step S304).

In a case where it is determined that the cardinality is 1, the surjection graph generating unit 313 erases the target column from the analysis data management information 320 through the data correcting unit 312. Thereafter, the surjection graph generating unit 313 proceeds to Step S310. Since the column having a cardinality of "1" is not needed to check the relation with the other columns, the column is erased from the analysis data management information 320.

In a case where it is determined that the cardinality is not "1", the surjection graph generating unit 313 selects a target category from among the categories of the target column (Step S306).

Next, the surjection graph generating unit 313 calculates the number of values belonging to the target category as the appearance frequency (Step S307).

In a case where the values of the target column are "a1, a1, a2, a3, a3, a4, a4, a4", and the target category is "a4", the appearance frequency becomes "3".

Next, the surjection graph generating unit 313 determines whether all the categories of the target column are processed (Step S308).

In a case where it is determined that all the categories of the target column are not completely processed, the surjection graph generating unit 313 returns to Step S306.

In a case where it is determined that all the categories of the target column are completely processed, the surjection graph generating unit 313 updates the cardinality information 1500 (Step S309).

Specifically, the data configured by the name of the target column, the name of the category, and the appearance frequency is added to the cardinality information 1500 by the surjection graph generating unit 313.

After the process of Step S305 or Step S309 is completed, the surjection graph generating unit 313 determines whether the processes of all the columns of the analysis data management information 320 are completed (Step S310).

In a case where it is determined that the processes of all the columns of the analysis data management information 320 are not completed, the surjection graph generating unit 313 returns to Step S301.

In a case where it is determined that the processes of all the columns of the analysis data management information 320 are completed, the surjection graph generating unit 313 outputs the cardinality information 1500 to the memory 302 (Step S311), and ends the appearance frequency calculating process.

Figure 22:
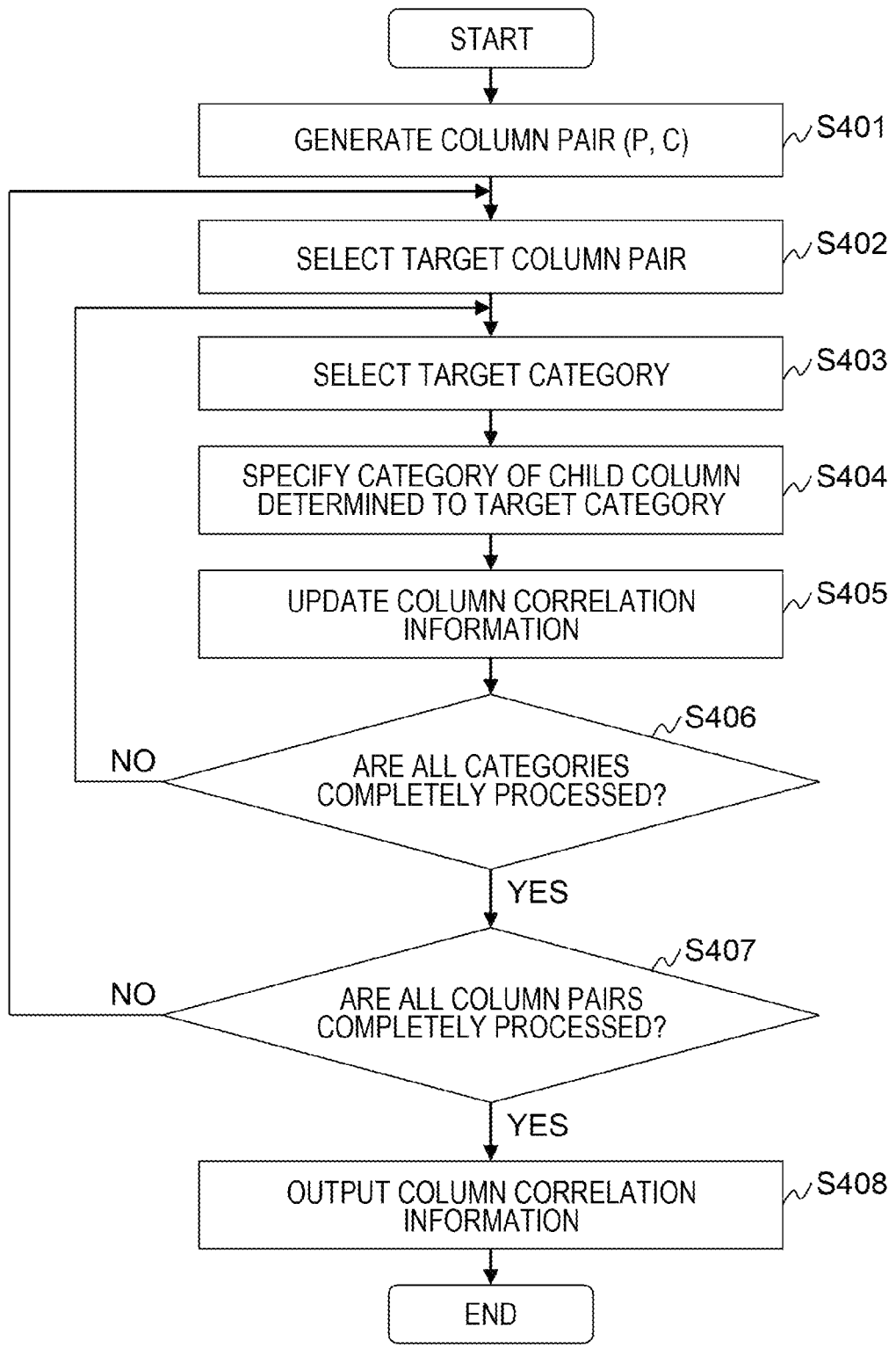
FIG. 22 is a flowchart for describing an example of a column correspondence extracting process which is performed by the analysis device of the first embodiment.

FIG. 22 is a flowchart for describing an example of the column correspondence extracting process which is performed by the analysis device 107 of the first embodiment.

The surjection graph generating unit 313 generates a column pair (P, C) which is a combination of the columns of the analysis data management information 320 (Step S401). Column P indicates a parent column, and Column C indicates a child column. In the first embodiment, the surjection graph generating unit 313 analyzes the correspondence from the category of the parent column to the category of the child column. Therefore, a column pair (temperature, pressure) and a column pair (pressure, temperature) are considered as different column pairs.

Further, the information of the column pair is also used in the other processes. Therefore, the surjection graph generating unit 313 performs controls not to erase the information from the memory 302 even after the column correspondence extracting process ends.

Next, the surjection graph generating unit 313 selects a target column pair from among the column pairs (Step S402).

Next, the surjection graph generating unit 313 selects a target category from among the categories of the parent column with reference to the cardinality information 1500 (Step S403).

Next, the surjection graph generating unit 313 specifies the category of the child column which is set to the target category of the parent column (Step S404).

Specifically, the surjection graph generating unit 313 extracts a set of a value belonging to the target category and a value of the child column in a unit of row. The surjection graph generating unit 313 specifies a category to which the value of the child column belongs with respect to the cardinality information 1500. With the above processes, the category of the child column set to the target category of the parent column is specified.

Next, the surjection graph generating unit 313 updates the column correspondence information 1600 (Step S405).

Specifically, the data configured by the target category and the category of the specified child column is added to the column correspondence information 1600 by the surjection graph generating unit 313.

Next, the surjection graph generating unit 313 determines whether the processes of all the categories of the parent column are completed (Step S406).

In a case where it is determined that the processes of all the categories of the parent column are not completed, the surjection graph generating unit 313 returns to Step S403.

In a case where it is determined that the processes of all the categories of the parent column are completed, the surjection graph generating unit 313 determines whether the processes of all the column pairs are completed (Step S407).

In a case where it is determined that the processes of all the column pairs are not completed, the surjection graph generating unit 313 returns to Step S402.

In a case where it is determined that the processes of all the column pairs are completed, the surjection graph generating unit 313 outputs the column correspondence information 1600 to the memory 302 (Step S408), and ends the column correspondence extracting process.

Figure 23:
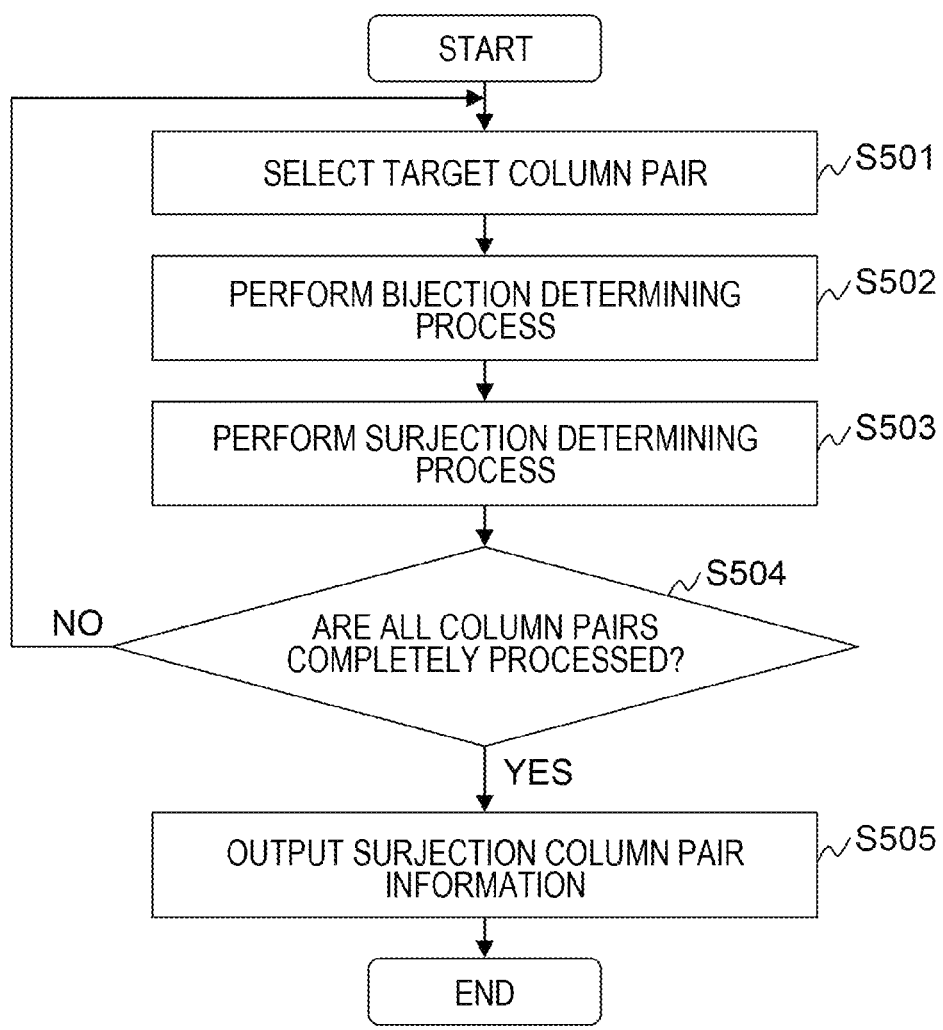
FIG. 23 is a flowchart for describing an example of a mapping determining process which is performed by the analysis device of the first embodiment.

FIG. 23 is a flowchart for describing an example of the mapping determining process which is performed by the analysis device 107 of the first embodiment.

The surjection graph generating unit 313 selects a target column pair (Step S501). Herein, a process result of Step S401 is used as it is.

The surjection graph generating unit 313 performs a bijection determining process on the target column pair (Step S502), and performs a surjection determining process (Step S503). The details of the bijection determining process will be described using FIG. 24, and the details of the surjection determining process will be described using FIG. 25.

Next, the surjection graph generating unit 313 determines whether the processes of all the column pairs are completed (Step S504).

In a case where it is determined that the processes of all the column pairs are not completed, the surjection graph generating unit 313 returns to Step S501.

In a case where it is determined that the processes of all the column pairs are completed, the surjection graph generating unit 313 outputs the surjection column pair information 321 to the storage device 303 (Step S505), and ends the surjection determining process.

Specifically, the surjection graph generating unit 313 registers the data of the bijection column pair and the surjection column pair as JSON-format data in the surjection column pair information 321 with reference to the list described below.

Figure 24:
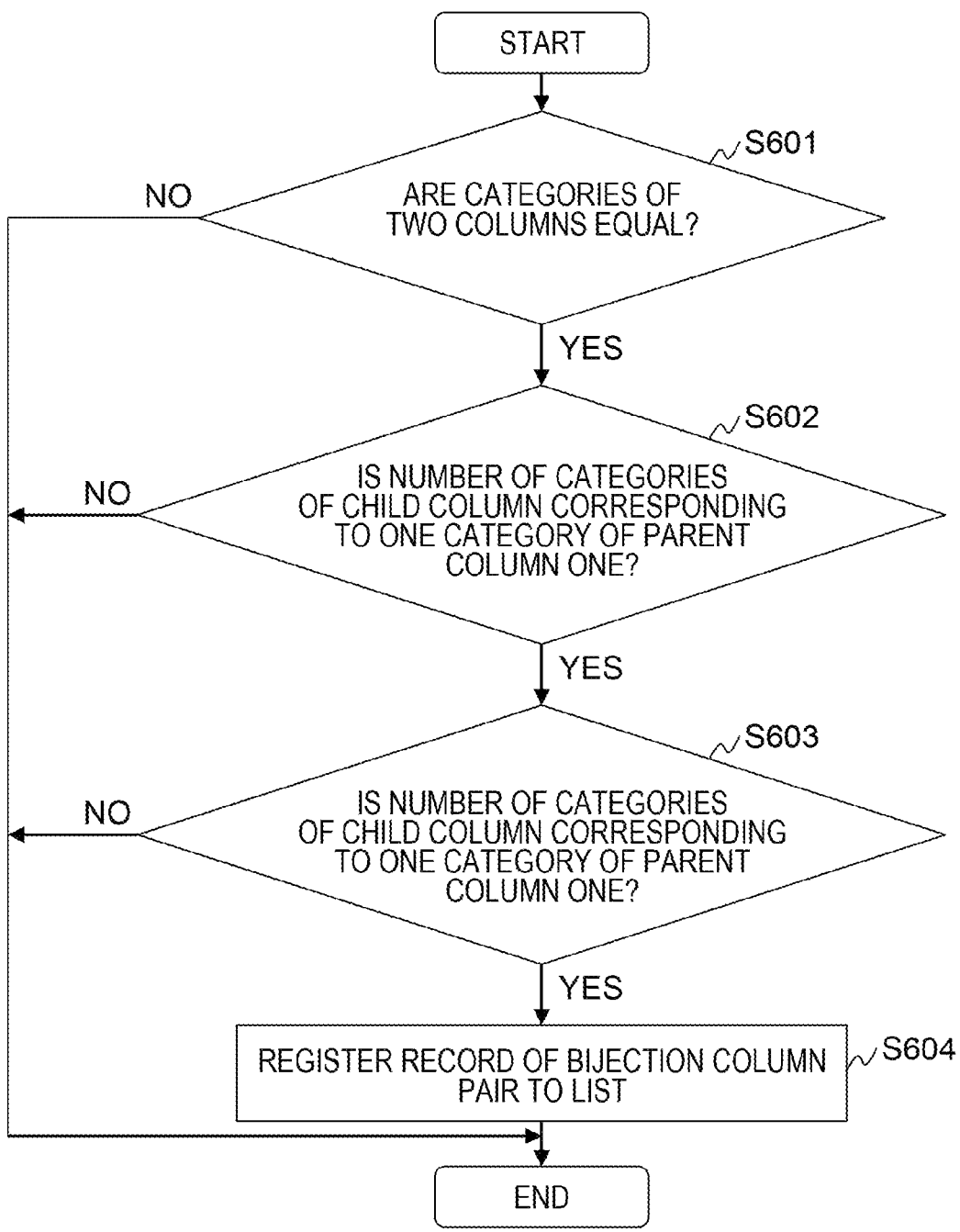
FIG. 24 is a flowchart for describing an example of a bijection determining process which is performed by the analysis device of the first embodiment.

FIG. 24 is flowchart for describing an example of the bijection determining process which is performed by the analysis device 107 of the first embodiment.

The surjection graph generating unit 313 determines whether the cardinality of the parent column and the cardinality of the child column of the target column pair are equal with reference to the cardinality information 1500 (Step S601).

In a case where it is determined that the cardinality of the parent column and the cardinality of the child column are not equal, the surjection graph generating unit 313 ends the bijection determining process.

In a case where it is determined that the cardinality of the parent column and the cardinality of the child column are equal, the surjection graph generating unit 313 determines whether each category of the parent column has one category of the child column corresponding to one category of the parent column with reference to the column correspondence information 1600 (Step S602). In the following description, the condition that there is one category of the child column corresponding to one category of the parent column is referred to as a first condition.

The first condition is a condition to determine whether the category of the child column is uniquely set with respect to the category of the parent column. As another expression, the first condition is a condition to determine whether the correspondence from the category of the parent column to the category of the child column becomes mapping.

In a case where it is determined that at least one category of the parent column does not satisfy the first condition, the surjection graph generating unit 313 ends the bijection determining process.

In a case where it is determined that all the categories of the parent column satisfy the first condition, the surjection graph generating unit 313 determines whether each category of the child column has one category of the parent column corresponding to one category of the child column with reference to the column correspondence information 1600 (Step S603). In the following description, the condition that one category of the parent column corresponds to one category of the child column is referred to as a second condition.

The second condition is a condition to determine whether the category of the parent column is uniquely set with respect to the category of the child column.

In a case where it is determined that at least one category of the child column does not satisfy the second condition, the surjection graph generating unit 313 ends the bijection determining process.

In a case where it is determined that all the categories of the child column satisfy the second condition, the surjection graph generating unit 313 adds a record to store the data of the column pair which has the bijective correspondence to the list (Step S604), and ends the bijection determining process.

Specifically, the surjection graph generating unit 313 acquires data indicating the correspondence between the categories of the column pair from the column correspondence information 1600. Herein, the data indicating the correspondence from the category of the parent column to the category of the child column and the data indicating the correspondence from the category of the child column to the category of the parent column are acquired. The surjection graph generating unit 313 adds a record which is configured by the names of the parent column and the child column, the data indicating the correspondence between the categories of the acquired column pair, and the character string "injection" to the list.

In addition, the surjection graph generating unit 313 performs control to remove the column pair in which the parent column and the child column of the target column pair are replaced from the processing target. In a case where the correspondence between the columns is bijective, there is no need to perform the process on the column pair in which the parent column and the child column of the target column pair are replaced.

Figure 25:
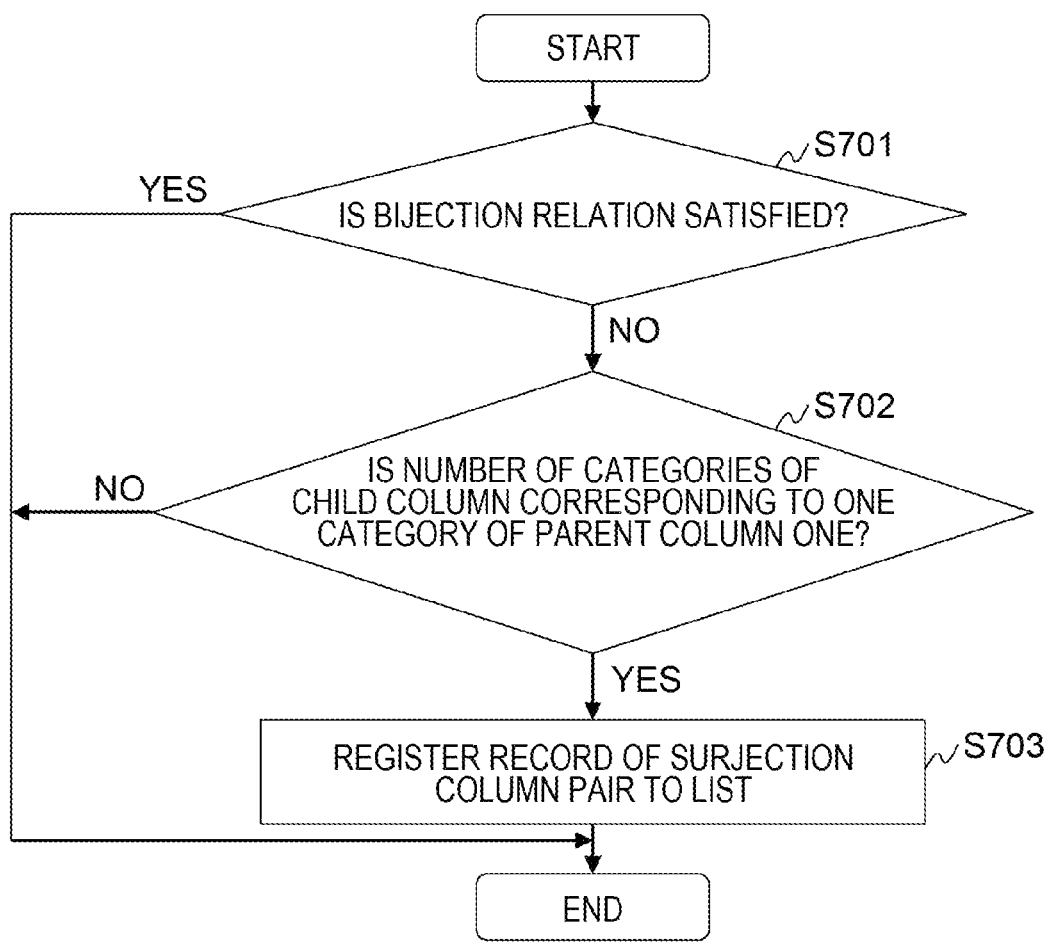
FIG. 25 is a flowchart for describing an example of a surjection determining process which is performed by the analysis device of the first embodiment.

FIG. 25 is flowchart for describing an example of the surjection determining process which is performed by the analysis device 107 of the first embodiment.

The surjection graph generating unit 313 determines whether the correspondence of the target column pair is bijective (Step S701).

Specifically, the surjection graph generating unit 313 determines whether the target column pair is registered as the bijection column pair with reference to the list.

In a case where it is determined that the correspondence of the target column pair is bijective, the surjection graph generating unit 313 ends the surjection determining process.

In a case where it is determined that the correspondence of the target column pair is not bijective, the surjection graph generating unit 313 determines whether each category of the parent column satisfies the first condition (Step S702).

In a case where it is determined that at least one category of the parent column does not satisfy the first condition, the surjection graph generating unit 313 ends the surjection determining process.

In a case where it is determined that all the categories of the parent column satisfy the first condition, the surjection graph generating unit 313 adds a record to store the data of the column pair which has the surjective correspondence to the list (Step S703), and ends the surjection determining process.

Specifically, the surjection graph generating unit 313 acquires data indicating the correspondence between the categories of the column pair from the column correspondence information 1600. Herein, the data indicating the correspondence from the category of the parent column to the category of the child column is acquired. The surjection graph generating unit 313 adds a record which is configured by the names of the parent column and the child column, the data indicating the correspondence between the categories of the acquired column pair, and the character string "surjection" to the list.

Figure 26:
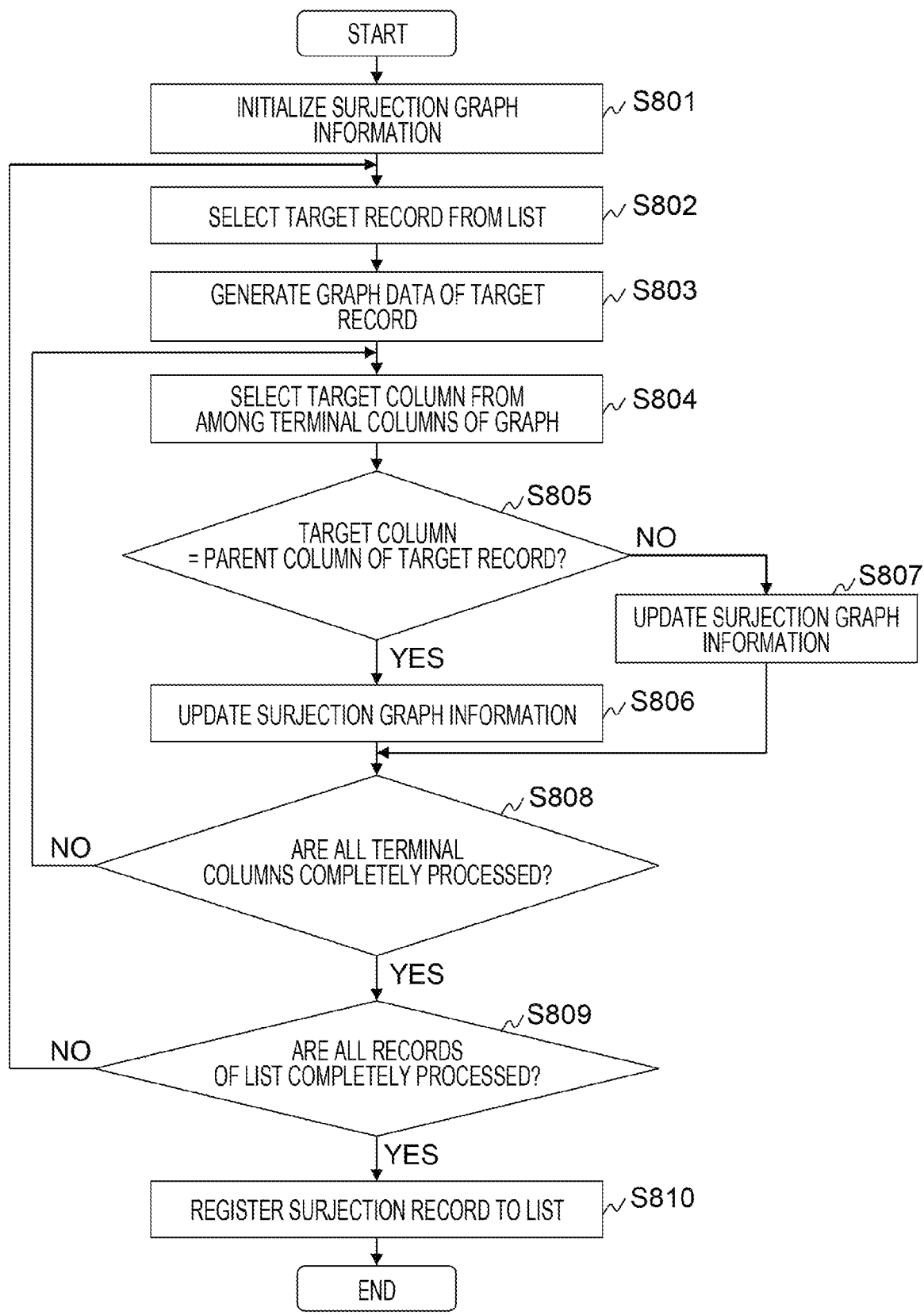
FIG. 26 is a flowchart for describing an example of a graph generating process which is performed by the analysis device of the first embodiment.

FIG. 26 is a flowchart for describing an example of a graph generating process which is performed by the analysis device 107 of the first embodiment.

The surjection graph generating unit 313 initializes the surjection graph information 322 (Step S801).

Next, the surjection graph generating unit 313 selects a target record from the list (Step S802).

Next, the surjection graph generating unit 313 generates graph data of the target record (Step S803).

Specifically, the surjection graph generating unit 313 generates data of the graph in which the nodes corresponding to the parent column and the child column are connected by edges.

Further, in a case where the correspondence between columns is bijective, the thickness and color of the edge connecting the columns may be set to be different from other edges. In addition, the thickness and color of the edge may be set on the basis of an overlapping degree of the category of the parent column with respect to the category of the child column. With this configuration, a combination of parameters to be focused in the analysis data may be presented to the analyst 20.

Next, the surjection graph generating unit 313 selects the target column from among the terminal columns corresponding to a leaf node of the graph with reference to the surjection graph information 322 (Step S804).

Next, the surjection graph generating unit 313 determines whether the target column is matched to the parent column of the target record (Step S805).

In a case where it is determined that the target column is matched to the parent column of the target record, the surjection graph generating unit 313 updates the surjection graph information 322 (Step S806). Thereafter, the surjection graph generating unit 313 proceeds to Step S808.

Specifically, the surjection graph generating unit 313 adds the graph data of the target record to the surjection graph information 322 to connect the parent column of the target record as the child column of the target column. In other words, the child column of the target record is connected to the target column.

Further, in a case where the target record includes the character string "injection", the following process is performed.

In a case where the target column is matched to the parent column of the target record, the surjection graph generating unit 313 determines whether the column directly connected to the target column is different from the child column of the target record.

In a case where it is determined that the column directly connected to the target column is different from the child column of the target record, the surjection graph generating unit 313 adds the graph data of the target record to the surjection graph information 322 to connect the parent column of the target record as the child column of the target column. In other words, the child column of the target record is connected to the target column.

The above-described process is a process of preventing that the parent column of a certain column is connected as the child column of the column.

Further, the data may be set such that the display method of the column varies according to the number of branches from one column to the other columns. For example, it is considered that the column of which the number of branches is 3 or more is highlighted. With this configuration, an important parameter in the analysis data may be presented to the analyst 20.

In a case where it is determined that the target column is not matched to the parent column of the target record, the surjection graph generating unit 313 updates the surjection graph information 322 (Step S807). Thereafter, the surjection graph generating unit 313 proceeds to Step S808.

Specifically, the surjection graph generating unit 313 adds the graph data of the target record to the surjection graph information 322 to connect the parent column of the target record to the root node.

In Step S808, the surjection graph generating unit 313 determines whether the processes are completed on all the terminal columns (Step S808).

In a case where it is determined that the processes are not completed on all the terminal columns, the surjection graph generating unit 313 returns to Step S804.

In a case where it is determined that the processes are completed on all the terminal columns, the surjection graph generating unit 313 determines whether the processes are completed on all the records of the list (Step S809).

In a case where it is determined the processes are not completed on all the records of the list, the surjection graph generating unit 313 returns to Step S802.

In a case where it is determined that the processes are completed on all the records of the list, the surjection graph generating unit 313 outputs the surjection graph information 322 to the storage device 303 (Step S810). The data of the graph generated by the above processes is denoted as forward tree structure data.

Further, in a case where the surjection graph information 322 is empty, the surjection graph generating unit 313 adds the graph data of the target record to the surjection graph information 322.

Further, the process of Step S805 may be replaced to the process described below. In other words, the surjection graph generating unit 313 determines whether the parent column of the target column is matched to the child column of the target record. In this case, in Step S806, the surjection graph generating unit 313 adds the graph data of the target record to the surjection graph information 322 to connect the child column of the target record as the parent column of the target column. The data of the graph generated by the above-described processes is denoted as backward tree structure data.

Figure 29:
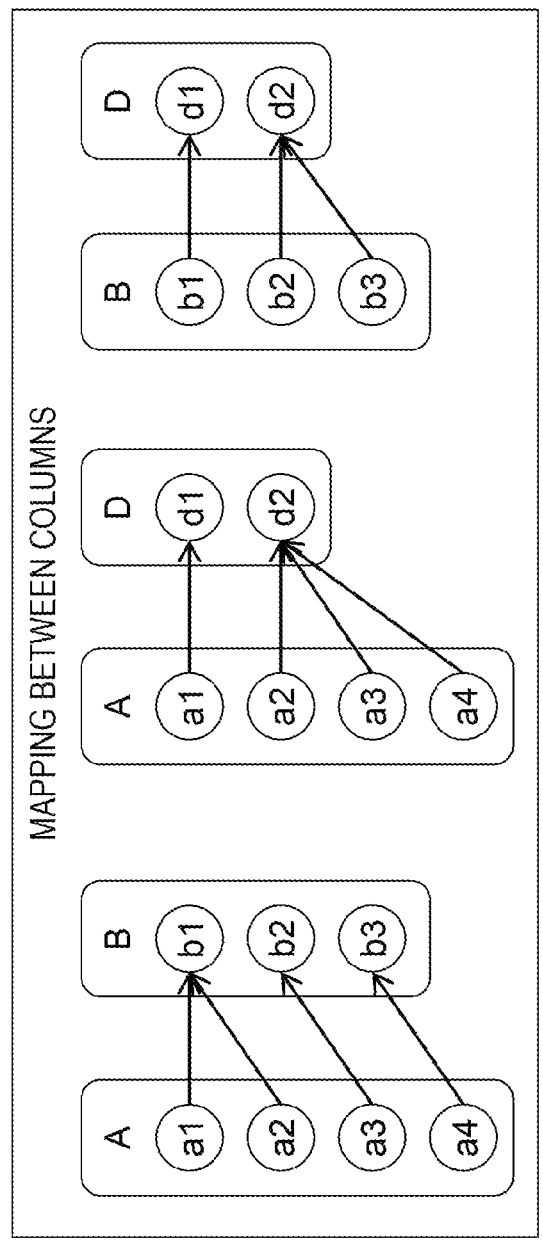
FIG. 29 is a diagram illustrating an example of correspondence (mapping) between columns which are indicated by the surjection column pair information of the first embodiment.
Figures 30A, 30B:
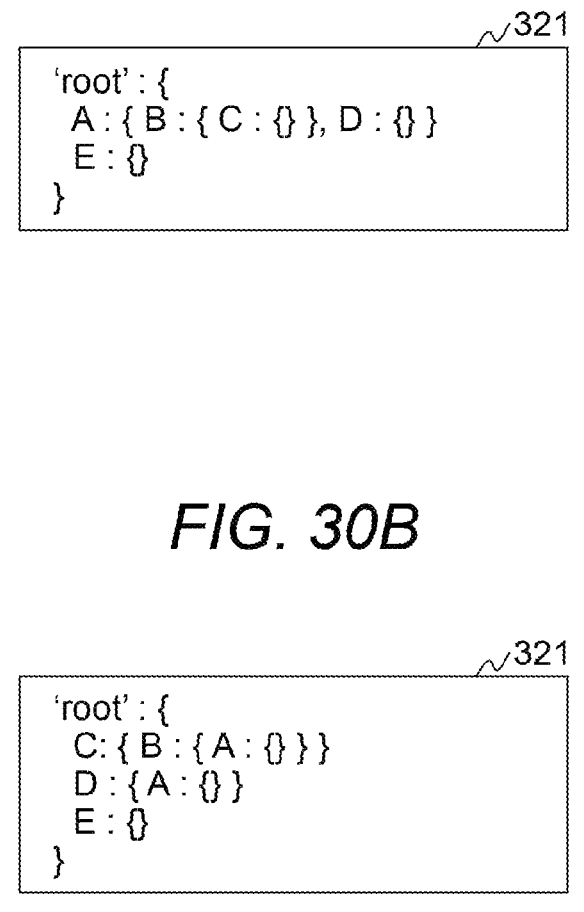
Figure 31A:
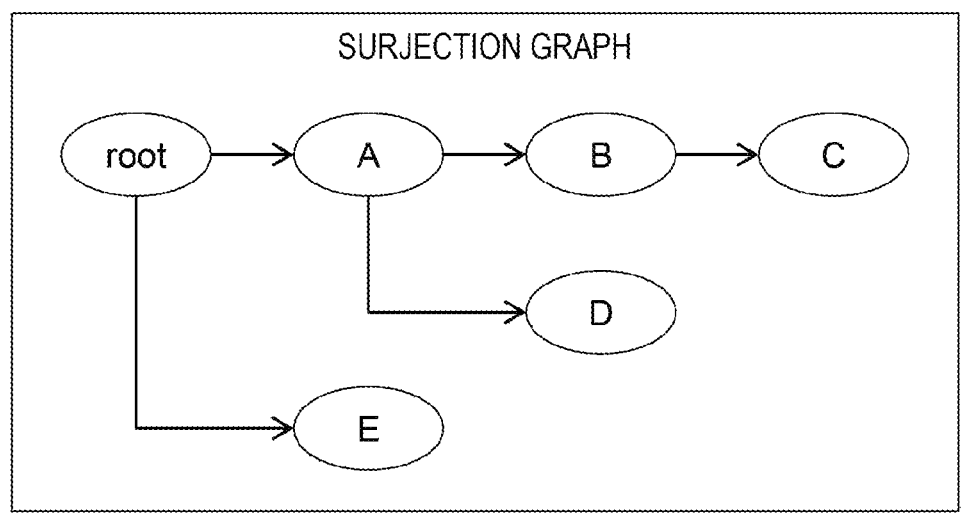
FIG. 31A is a diagram illustrating an example of a graph (tree) which is indicated by the surjection graph information of the first embodiment.
Figure 31B:
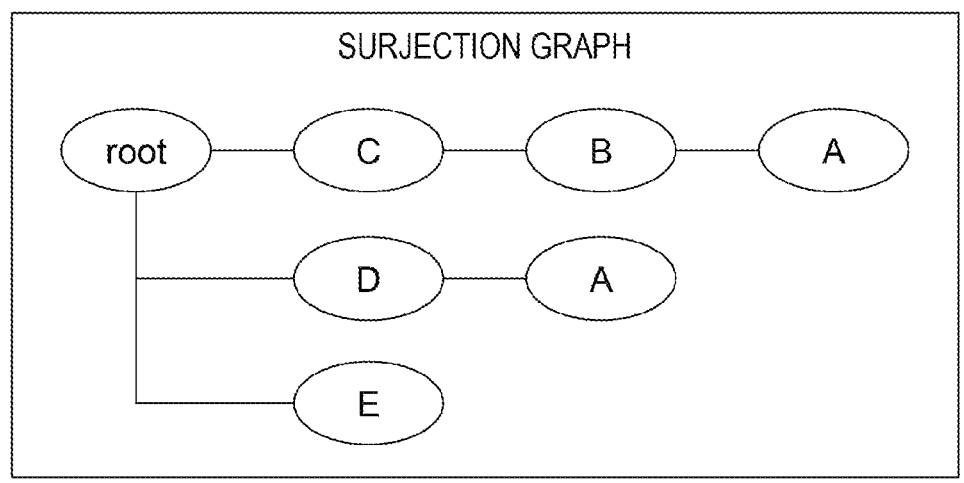
FIG. 31B is a diagram illustrating an example of a graph (tree) which is indicated by the surjection graph information of the first embodiment.

Herein, the column analysis process will be described using a specific example. FIG. 27 is a diagram illustrating an example of the analysis data management information 320 which is input in the column analysis process of the first embodiment. FIG. 28 is a diagram illustrating an example of the surjection column pair information 321 which is output in the column analysis process of the first embodiment. FIG. 29 is a diagram illustrating an example of correspondence (mapping) between columns which are indicated by the surjection column pair information 321 of the first embodiment. FIGS. 30A and 30B are diagrams illustrating an example of the surjection graph information 322 which is output in the column analysis process of the first embodiment. FIGS. 31A and 31B are diagrams illustrating an example of a graph (tree) which is indicated by the surjection graph information 322 of the first embodiment.

The analysis data management information 320 illustrated in FIG. 27 stores six pieces of analysis data of which the names are "A", "B", "C", "D", and "E" of the column.

The result of the appearance frequency calculating process with respect to the analysis data management information 320 illustrated in FIG. 27. For the column "A", the category "a1" and the appearance frequency "1", the category "a2" and the appearance frequency "1", the category "a3" and the appearance frequency "2", and the category "a4" and the appearance frequency "2" are obtained. For the column "B", the category "b1" and the appearance frequency "2", the category "b2" and the appearance frequency "2", and the category "b3" and the appearance frequency "2" are obtained. For the column "C", the category "c1" and the appearance frequency "2", and the category "c2" and the appearance frequency "4" are obtained. For the column "D", the category "d1" and the appearance frequency "1", and the category "d2" and the appearance frequency "5" are obtained. For the column "E", the category "e1" and the appearance frequency "3", and the category "e2" and the appearance frequency "3" are obtained.

As a result of performing the column correspondence extracting process and the mapping determining process on the analysis data management information 320 illustrated in FIG. 27, the surjection column pair information 321 illustrated in FIG. 28 is generated. The surjection column pair information 321 illustrated in FIG. 28 is information to define the correspondence (mapping) between the columns illustrated in FIG. 29.

In addition, as a result of the graph generating process on the analysis data management information 320 illustrated in FIG. 27, the surjection graph information 322 indicating the forward tree structure data illustrated in FIG. 30A is generated. Further, the surjection graph information 322 illustrated in FIG. 30A is information to define the graph illustrated in FIG. 31A. Further, in a case where the process of generating the backward tree structure data is performed, the surjection graph information 322 illustrated in FIG. 30B is generated. The surjection graph information 322 illustrated in FIG. 30B is information to define the graph illustrated in FIG. 31B.

Next, the yield analysis performed by the analysis device 107 will be described.

Figure 32:
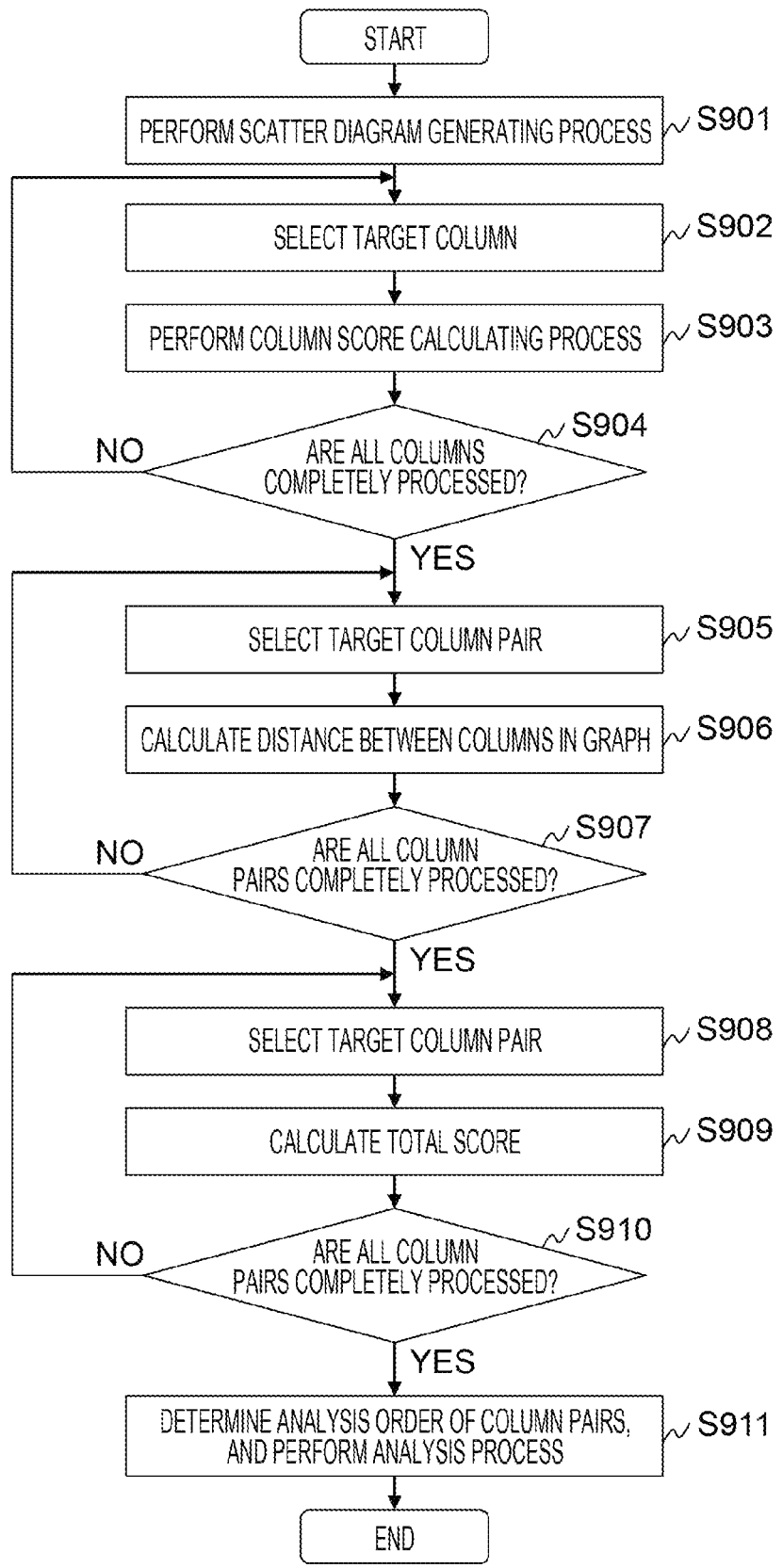
FIG. 32 is a flowchart for describing an example of an analysis data analyzing process which is performed by the analysis device of the first embodiment.

FIG. 32 is a flowchart for describing an example of the yield analysis which is performed by the analysis device 107 of the first embodiment.

In a case where the surjection column pair information 321 is output, or in a case where an instruction is received from the analyst 20, the analysis unit 314 performs the yield analysis periodically.

First, the analysis unit 314 performs a scatter diagram generating process (Step S901). The details of the scatter diagram generating process will be described using FIG. 33.

Next, the analysis unit 314 selects the target column with reference to the analysis data management information 320 (Step S902).

Next, the analysis unit 314 performs a column score calculating process using the target column and the scatter diagram (Step S903). The column score calculating process is a process for calculating a column score to evaluate an analysis result of the analysis data in the feature space on the basis of the target column. The details of the column score calculating process will be described using FIG. 34.

Next, the analysis unit 314 determines whether all the columns of the analysis data management information 320 are completely processed (Step S904).

In a case where it is determined that the processes of all the columns of the analysis data management information 320 are not completed, the analysis unit 314 returns to Step S902.

In a case where it is determined that all the columns of the analysis data management information 320 are completely processed, the analysis unit 314 selects the target column pair (Step S905).

Next, the analysis unit 314 calculates a distance in the graph of the column between the columns of the target column pair (Step S906).

Specifically, the analysis unit 314 calculates the number of columns passing through when moving from one column to another column of the target column pair as a distance. For example, in the case of the graph of the column illustrated in FIG. 31A, the distance of a column pair (A, C) is calculated to be "2", the distance of a column pair (C, D) is calculated to be "3", and the distance of a column pair (B, E) is calculated to be "3".

Next, the analysis unit 314 determines whether the processes of all the column pairs are completed (Step S907).

In a case where it is determined that the processes of all the column pairs are not completed, the analysis unit 314 returns to Step S905.

In a case where it is determined that the processes of all the column pairs are completed, the analysis unit 314 starts the loop process of the column pair again. In other words, the analysis unit 314 selects the target column pair (Step S908). Further, the analysis unit 314 normalizes the distance of each column pair to start the loop process of the column pair. For example, the analysis unit 314 normalizes the distance of the column pair to make a maximum value of the distance be "1".

Next, the analysis unit 314 calculates a total score on the basis of the column score of each column of the target column pair and the distance (Step S909).

The analysis unit 314 calculates the total score on the basis of the following Formula (1) for example. Herein, St indicates the total score, S[Ci] indicates the column score of a column Ci, and D[Ci, Cj] indicates the distance between the columns Ci and Cj on the graph of the column. In addition, Dmax indicates a maximum value of the distance, and k indicates an arbitrary coefficient.

[Formula 1]

$$St = (S[C_i] + S[C_j]) + k\frac{D[C_i, C_j]}{D\max} \quad (1)$$

Next, the analysis unit 314 determines whether the processes of all the column pairs are completed (Step S910).

In a case where it is determined that the processes of all the column pairs are not completed, the analysis unit 314 returns to Step S908.

In a case where it is determined that the processes of all the column pairs are completed, the analysis unit 314 determines an analysis order of the column pair on the basis of the total score, and performs the yield analysis (Step S911).

Specifically, the analysis unit 314 determines the analysis order of the column pair to analyze the column pair having a high total score with priority. A well-known technique may be employed for the yield analysis, and thus the detailed description thereof will be omitted.

In this way, if the analysis device 107 in the yield analysis is expanded in the number of analyzing column pairs, the column pairs of the analysis target may be narrowed down. In addition, the analysis device 107 performs the analysis on the basis of the analysis order, so that a useful result can be obtained at a high speed. In other words, according to the first embodiment, it is possible to perform the yield analysis with efficiency, and to improve the accuracy.

Figure 33:
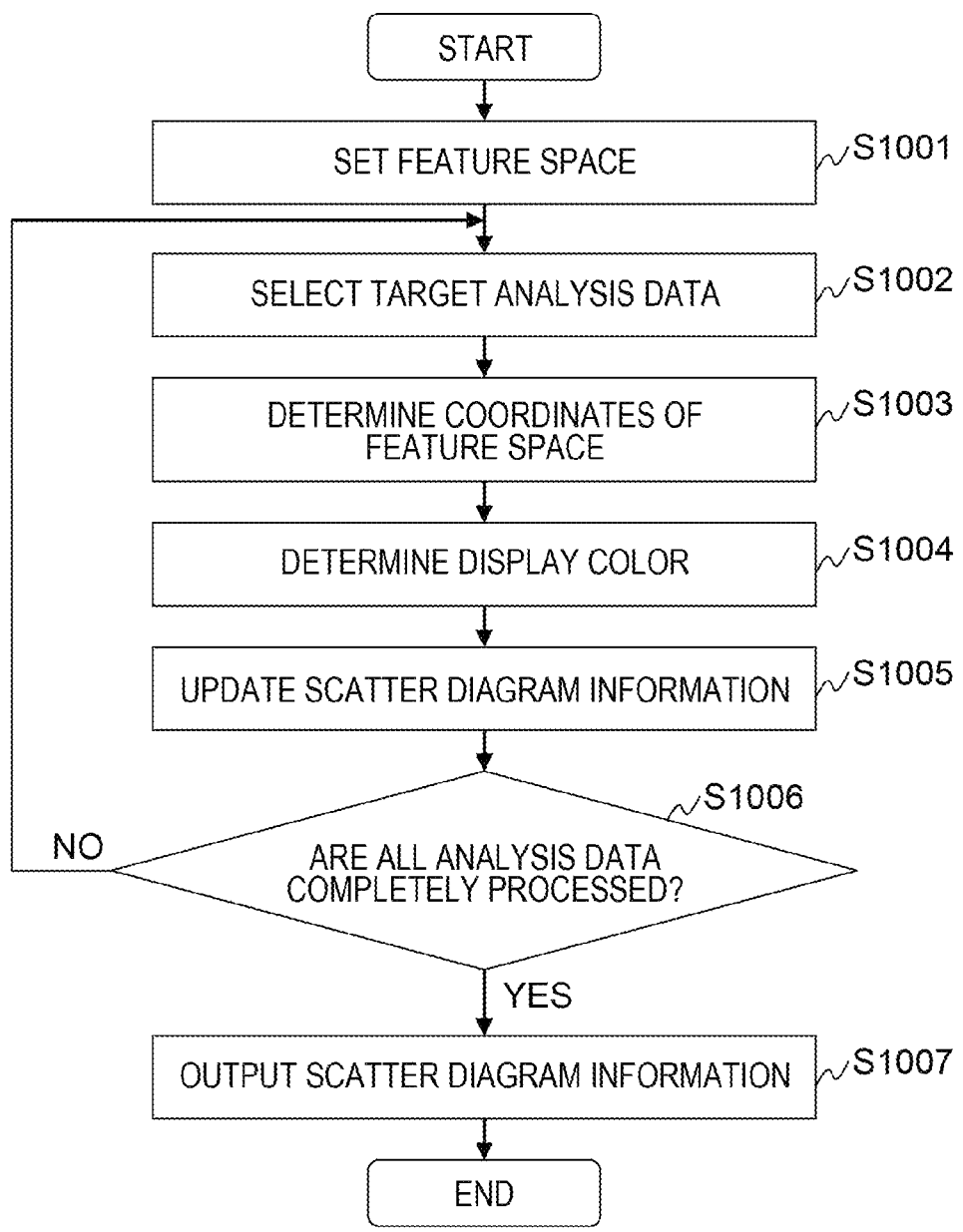
FIG. 33 is a flowchart for describing an example of a scatter diagram generating process which is performed by the analysis unit of the first embodiment.

FIG. 33 is a flowchart for describing an example of a scatter diagram generating process which is performed by the analysis unit 314 of the first embodiment.

First, the analysis unit 314 sets the feature space (Step S1001).

Specifically, the analysis unit 314 sets the feature space which has a field to store the value indicating the quality as an axis. Further, all the fields may be not used. In this case, the field of the feature space is designated in advance.

Next, the analysis unit 314 selects target analysis data from the analysis data management information 320 (Step S1002).

Next, the analysis unit 314 determines coordinates of the target analysis data in the feature space (Step S1003).

Specifically, the analysis unit 314 determines a set of the values of the fields corresponding to the axis of the feature space to the coordinates of the target analysis data of the feature space.

Next, the analysis unit 314 determines a display color of the target analysis data (Step S1004). Specifically, the following process is performed.

The analysis unit 314 selects the target column from among the columns corresponding to the control data and the state data which form the analysis data.

The analysis unit 314 calculates an index form the value of the field corresponding to the target column. For example, the analysis unit 314 calculates the category as the index. The analysis unit 314 determines a color which is assigned to the index. The color is set randomly for example. However, the color is determined not to be overlapped with the color to which a different index is assigned. The analysis unit 314 performs the same process on each field.

Further, the display color may be determined for a specific column. In this case, a column to determine the display color is designated in advance. Hitherto, the process of Step S1004 has been described.

Next, the analysis unit 314 updates the scatter diagram information 400 (Step S1005).

Specifically, the analysis unit 314 adds data configured by the coordinates, the display color, and the index to the scatter diagram information 400. Further, in a case where one piece of scatter diagram information 400 is generated for one column, the analysis unit 314 adds data configured by the coordinates and the display color to the scatter diagram information 400 of one column.

Next, the analysis unit 314 determines whether the processes of all the analysis data is completed (Step S1006).

In a case where it is determined that the processes of all the analysis data are not completed, the analysis unit 314 returns to Step S1002.

In a case where it is determined that the processes of all the analysis data are completed, the analysis unit 314 outputs the scatter diagram information 400 to the storage device 303 (Step S1007), and ends the scatter diagram generating process.

Figure 34:
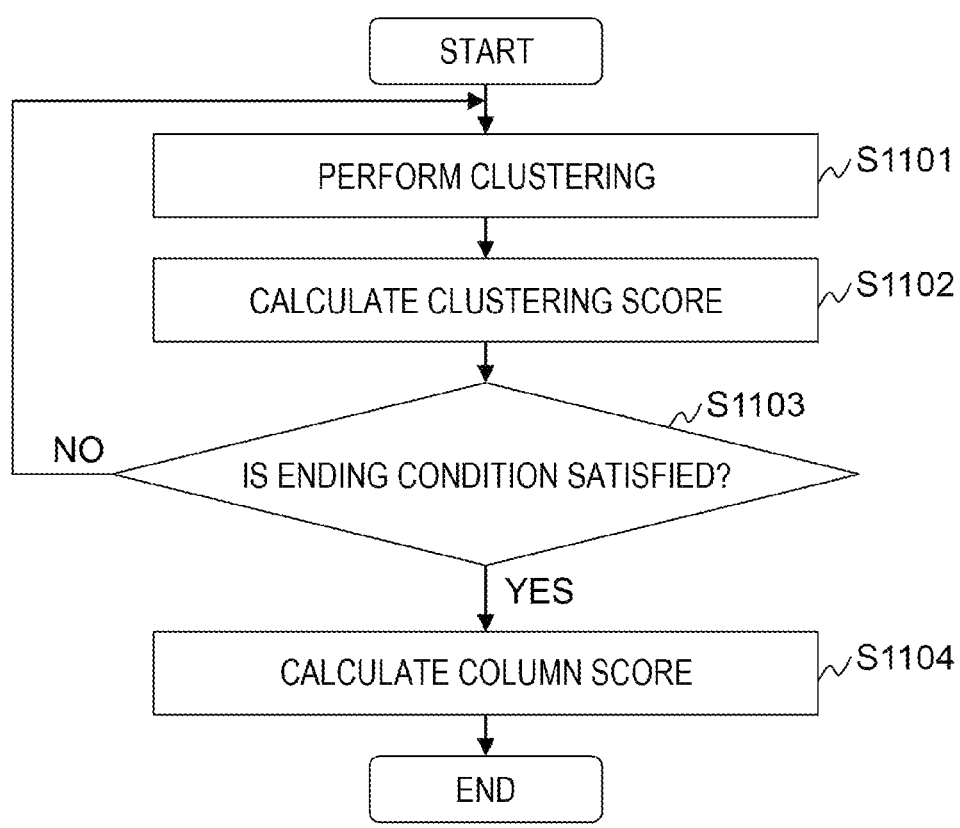
FIG. 34 is a flowchart for describing an example of a column score calculating process which is performed by the analysis unit of the first embodiment.

FIG. 34 is a flowchart for describing an example of a column score calculating process which is performed by the analysis unit 314 of the first embodiment.

The analysis unit 314 acquires the scatter diagram information 400 corresponding to the target column, and performs a clustering on the basis of the target column (Step S1101). Further, the invention is not limited to the method of clustering. For example, k-means may be used.

Next, the analysis unit 314 calculates a clustering score to evaluate the result of the clustering (Step S1102).

For example, in a case where the clustering is performed several times, the analysis unit 314 calculates a separation degree of the clusters whenever performing the clustering.

Next, the analysis unit 314 determines whether an ending condition is satisfied (Step S1103).

For example, the analysis unit 314 determines whether the number of times of the clustering is equal to or more than a threshold.

In a case where it is determined that the ending condition is not satisfied, the analysis unit 314 returns to Step S1101.

In a case where it is determined that the ending condition is satisfied, the analysis unit 314 calculates the column score (Step S1104).

For example, the analysis unit 314 calculates the average value of the clustering score as the column score. Further, in a case where the clustering is not performed several times, the analysis unit 314 may calculate the clustering score as the column score.

Figure 35:
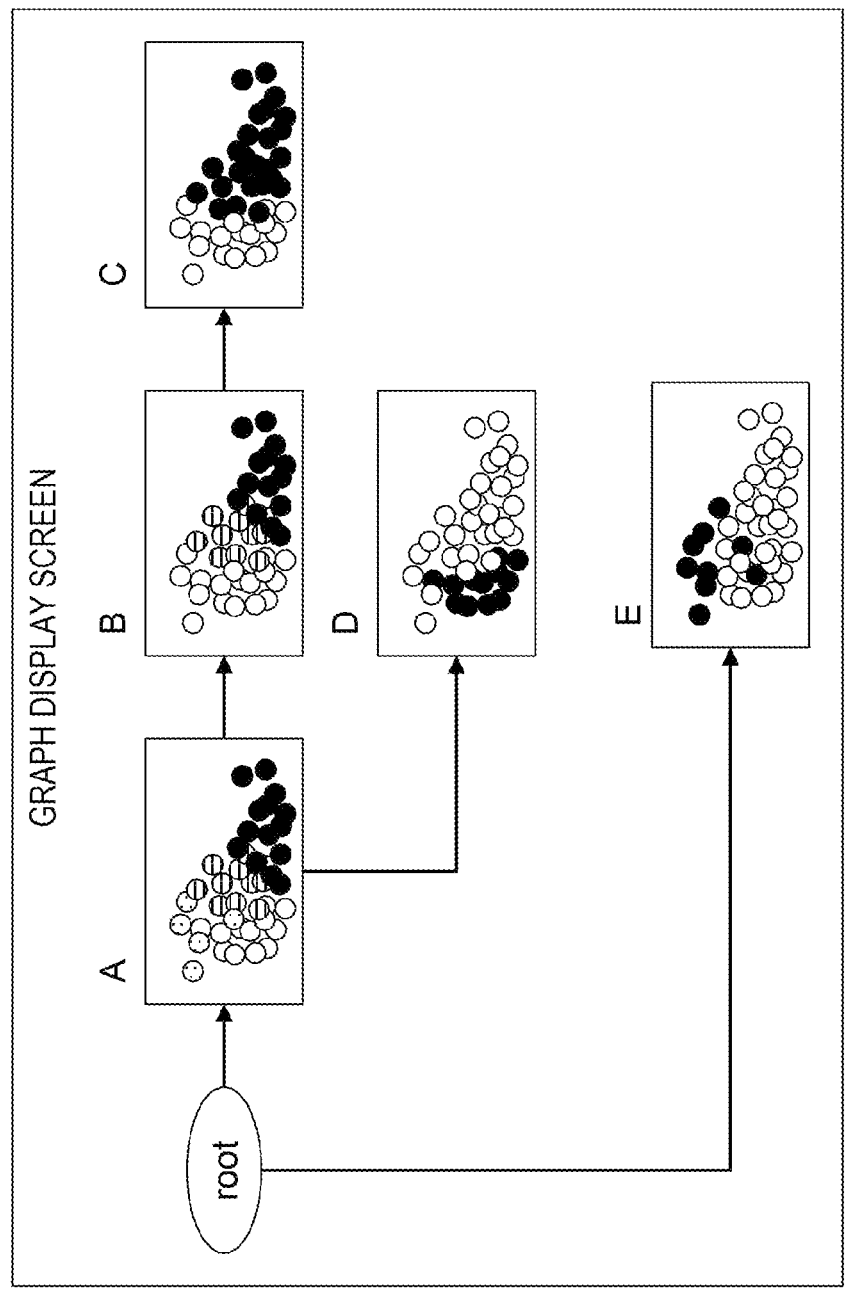
FIG. 35 is a diagram illustrating an example of a graph display screen 3500 which is displayed by a user interface of the first embodiment.

FIG. 35 is a diagram illustrating an example of a graph display screen 3500 which is displayed by a user interface 316 of the first embodiment.

The graph display screen 3500 is a screen to display a scatter diagram which is color-corded in the graph of the column on the basis of the index of the column.

The visualization unit 315 generates graph display information 402 to display the graph display screen 3500 on the basis of the surjection graph information 322 and the scatter diagram information 400.

The visualization unit 315 may display only the graph of the column according to a request of the analyst 20. In this case, the visualization unit 315 generates the graph display information 402 to display the graph of the column illustrated in FIG. 31A or 31B on the basis of the surjection graph information 322 FIG. 31A or 31B.

The analyst 20 can grasp the data structure such as a relation between the fields of the analysis data by referring to the graph of the column illustrated in FIGS. 31A and 31B. For example, it can be visually understood that the value of the field corresponding to Column B and Column D is uniquely determined with respect to the value of the field corresponding to Column A. In addition, new information such as a case where the control data is different even the products are equal can be found out visually and understood.

In addition, the analyst 20 can visually grasp the parameter causing a variation of the quality by referring to the graph illustrated in FIG. 35. In addition, it is possible to be understood whether the data is wrong using the parameters close to each other on the graph.

In the process described above, the bijection column pair and the surjection column pair are processed separately, but the process may be performed only using the surjection column pair. In this case, the bijection determining process is not performed. In addition, in the graph generating process, the surjection graph generating unit 313 performs the process of Step S806 only in a case where the target column is matched to the parent column of the target record, and the column directly connected to the target column is different from the child column of the target record in order to prevent the parent column of a certain column from being connected as the child column.

As described above, according to the first embodiment, it is possible to perform the yield analysis with efficiency, and to improve the accuracy. In addition, the analyst 20 can visually grasp the feature of the analysis data and the important parameters in the yield analysis.

Second Embodiment

In a second embodiment, a method of generating the surjection column pair information 321 is partially different. Hereinafter, the second embodiment will be described focusing on the difference from the first embodiment.

In a case where the number of categories of the column is large, the correspondence between the columns is less likely to be surjective or bijective. Therefore, the graph of the column in which the columns are connected in a multistage manner is not generated. Therefore, it is not possible to present information useful to the analyst 20.

Therefore, in the second embodiment, a process in which the data is processed such that the correspondence between the columns becomes surjective or bijective is performed.

The system configuration and the device configuration of the second embodiment are the same as those of the first embodiment. The data structure of information of the second embodiment is the same as that of the first embodiment.

Figure 36:
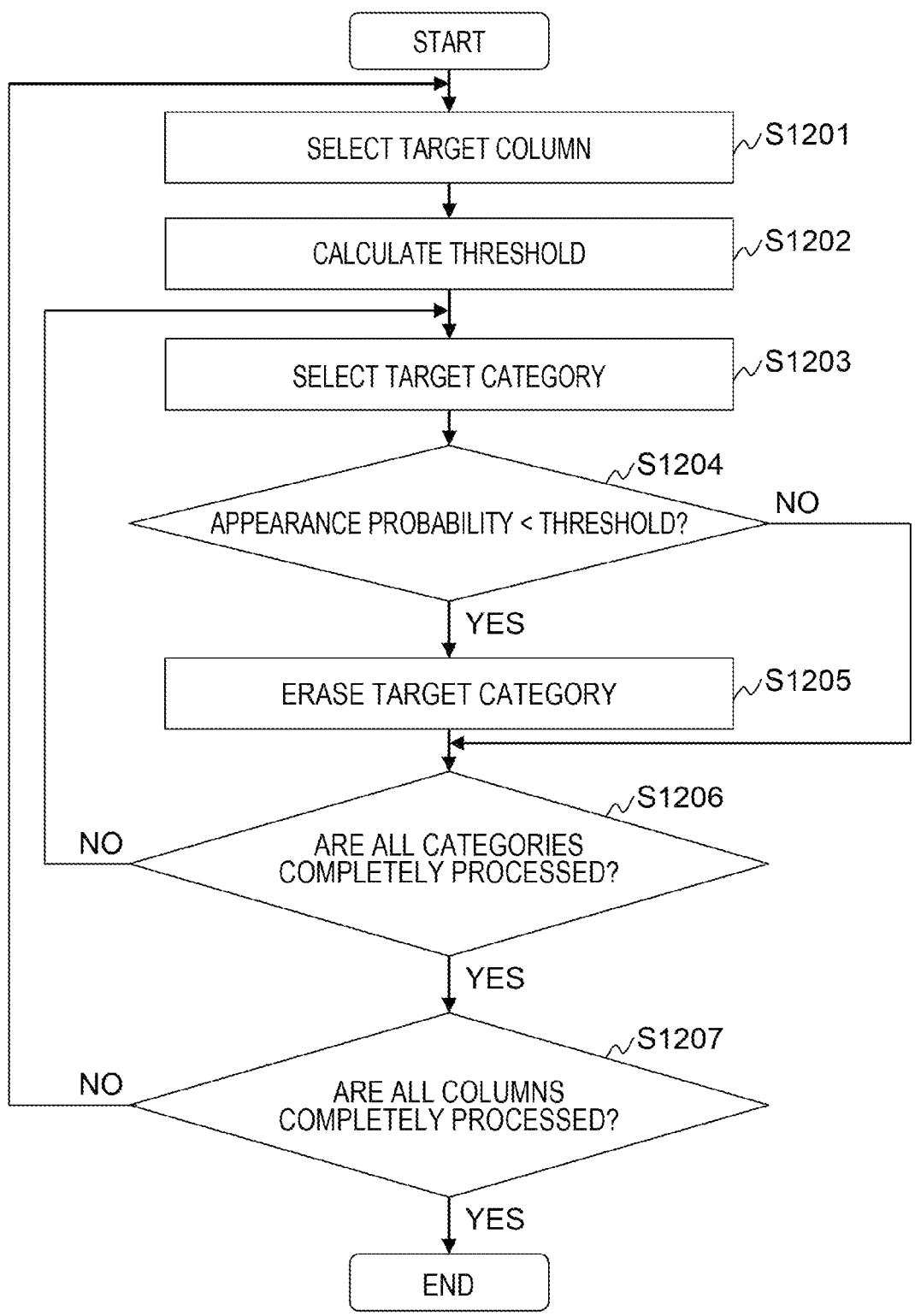
FIG. 36 is a flowchart for describing an example of a column erasing process which is performed by an analysis device of a second embodiment.

The process performed by the label generating unit 310 of the second embodiment is the same as that of the first embodiment. In the second embodiment, the column analysis process is different partially. Specifically, the analysis device 107 performs a category erasing process after the process of Step S202. FIG. 36 is a flowchart for describing an example of a column erasing process which is performed by an analysis device 107 of a second embodiment.

The surjection graph generating unit 313 selects the target column with reference to the cardinality information 1500 (Step S1201).

Next, the surjection graph generating unit 313 calculates a threshold of the target column (Step S1202).

Specifically, the surjection graph generating unit 313 calculates an appearance probability of the value belonging to each category of the target column with reference to the cardinality information 1500. The surjection graph generating unit 313 calculates the threshold of the target column using a center value of the appearance probability. For example, a value obtained by multiplying 0.1 to the center value of the appearance probability is calculated as the threshold. The described above threshold is used to remove the category to which a low appearance probability belongs as a noise.

Further, the above calculation method is an example, and the invention is not limited thereto. For example, the threshold may be calculated on the basis of the appearance frequency. In addition, the threshold may be determined by performing a machine learning.

Next, the surjection graph generating unit 313 selects the target category from among the category of the target column (Step S1203).

Next, the surjection graph generating unit 313 determines whether the appearance probability of the value belonging to the target category is less than the threshold (Step S1204).

In a case where it is determined that the appearance probability of the value belonging to the target category is equal to or more than the threshold, the surjection graph generating unit 313 proceeds to Step S1206.

In a case where it is determined that the appearance probability of the value belonging to the target category is less than the threshold, the surjection graph generating unit 313 erases the target category from the cardinality information 1500.

In Step S1206, the surjection graph generating unit 313 determines whether all the categories of the target column are processed (Step S1206).

In a case where it is determined that the processes of all the categories of the target column are not completed, the surjection graph generating unit 313 returns to Step S1203.

In a case where it is determined that the processes of all the categories of the target column are completed, the surjection graph generating unit 313 determines whether the processes of all the columns are completed (Step S1207).

In a case where it is determined that the processes of all the columns are not completed, the surjection graph generating unit 313 returns to Step S1201.

In a case where it is determined that the processes of all the columns are completed, the surjection graph generating unit 313 ends the category erasing process.

It is possible to increase the number of column pairs retrieved as the surjection column pair or the bijection column pair by erasing the category which becomes a noise.

In the second embodiment, the column correspondence extracting process is different partially. Specifically, after the process of Step S402, the surjection graph generating unit 313 reduces the number of categories of the column pair. In a case where the number of categories of the parent column and the child column is significantly large, the correspondence between the columns is less likely to be surjective or bijective. Then, the surjection graph generating unit 313 performs the clustering of the category of each column using an Infinite Relational Model (IRM), and reduces the number of categories. The IRM is a well-known technique, and thus the description thereof will be omitted.

According to the second embodiment, the column pairs of the bijection column pair and the surjection column pair can be increased. Therefore, it is possible to generate the graph of the column in which the columns are connected in a multistage manner. With this configuration, it is possible to present information useful to the analyst 20.

Further, the invention is not limited to the above embodiments, but includes various modifications. In addition, for example, the embodiments have been described about the configuration in detail in order to help with understanding on the invention, but the invention is not limited to the one equipped with all the configurations. In addition, some of the configurations of each embodiment may be added, deleted, or replaced with respect to the other configurations.

In addition, some or all of the configurations, the functions, the processing units, and processing devices may be realized in hardware by designing with an integrated circuit for example. In addition, the invention may be realized by a software program code which realizes the functions of the embodiments. In this case, a recording medium recorded with the program code is provided to a computer, and a processor of the computer reads out the program code stored in the recording medium. In this case, the program code itself read out of the recording medium is used to realize the functions of the above embodiments. The program code itself and the recording medium storing the program code is configured in the invention. As a recording medium to supply such a program code, for example, there are a flexible disk, a CD-ROM, a DVD-ROM, a hard disk, a Solid State Drive (SSD), an optical disk, a magneto-optical disk, a CD-R, a magnetic tape, a nonvolatile memory card, and a ROM.

In addition, the program code to realize the functions of each embodiment may be embedded by a wide program such as assembler, C/C++, perl, Shell, PHP, Java (registered trademark) or a script language.

Further, the software program code to realize the functions of the embodiment is distributed through a network, and stored in a recording unit such as a hard disk and a memory of the computer or a recording medium such as a CD-RW and a CD-R. The processor provided in the computer may read and perform the program code stored in the recording unit or the recording medium.

In the above embodiments, only control lines and information lines considered to be necessary for explanation are illustrated, but not all the control lines and the information lines for a product are illustrated. All the configurations may be connected to each other.

What is claimed is:

1. An analysis method performed by a computer which analyzes analysis data acquired from a system, the system including a plurality of devices to manufacture a product, wherein the computer includes a calculation device, a storage device connected to the calculation device, and a network interface connected to the calculation device, wherein the analysis data is configured by a plurality of fields to store a parameter related to the manufacturing of the product and at least one field to store an evaluation value indicating a quality of the product, the analysis method, comprising:

a first step of managing, by the computer, a set of values of each field of the analysis data as a column;

a second step of analyzing, by the computer, a correspondence from a value belonging to a first target column to a value belonging to a second target column to specify a surjection column pair which is a set of the first target column and the second target column, the first target column and the second target column which have a subjective correspondence;

a third step of generating, by the computer, graph information to manage a first graph of a tree structure indicating a connection relation of the first target column and the second target column by connecting a graph which has nodes of the first target column and the second target column of the surjection column pair; and a fourth step of performing, by the computer, a yield analysis to specify the parameter affecting the evaluation value using the graph information.

2. The analysis method according to claim 1, wherein the second step includes a fifth step of generating, by the computer, one or more categories by classifying values belonging to the column, and a sixth step of analyzing, by the computer, a correspondence from a value belonging to the category of the first target column to a value belonging to the category of the second target column, and wherein the third step includes selecting, by the computer, a first target surjection column pair, generating, by the computer, a graph which has nodes of the first target column and the second target column of the first target surjection column pair, selecting, by the computer, a terminal column corresponding to a leaf node of the first graph, determining, by the computer, whether the first target column of the first target surjection column pair is matched to the terminal column, and connecting, by the computer, the second target column of the first target surjection column pair to a leaf node corresponding to the terminal column in a case where the first target column of the first target surjection column pair is matched to the terminal column.

3. The analysis method according to claim 2, wherein the second step includes specifying, by the computer, a bijection column pair which is a set of the first target column and the second target column of which the correspondence becomes bijective, and specifying, by the computer, the surjection column pair from among a set of columns except the bijection column pair, and wherein the third step includes selecting, by the computer, a target bijection column pair, generating, by the computer, a graph which has nodes of the first target column and the second target column of the target bijection column pair, selecting, by the computer, the terminal column, determining, by the computer, whether the first target column of the target bijection column pair is matched to the terminal column, and the second target column of the target bijection column pair is different from a column corresponding to a node to which a node corresponding to the terminal column is connected, and connecting, by the computer, a node corresponding to the second target column of the target bijection column pair to a leaf node corresponding to the terminal column in a case where the first target column of the target bijection column pair is matched to the terminal column, and the second target column of the target bijection column pair is different from a column corresponding to a node to which a node corresponding to the terminal column is connected.

4. The analysis method according to claim 2, wherein the fifth step includes setting, by the computer, a range of a value in a case where a value belonging to the column is an analogue value, and generating, by the computer, the category on the basis of the range of the value.

5. The analysis method according to claim 2, wherein the sixth step includes analyzing, by the computer, a correspondence from the value belonging to the category of the first target column to the value belonging to the category of the second target column after the numbers of categories of the first target column and categories of the second target column are reduced.

6. The analysis method according to claim 2, wherein the fourth step includes generating, by the computer, data of a second graph indicating a position of the analysis data in a feature space which has the evaluation value as an axis, performing, by the computer, clustering of the analysis data in the feature space which is paid attention to a specific column with respect to the column, calculating, by the computer, a first score to evaluate the clustering on the basis of a result of the clustering, selecting, by the computer, a second target surjection column pair, calculating, by the computer, a distance between the first target column and the second target column of the second target surjection column pair in the second graph, calculating, by the computer, a second score to determine an analysis order of the surjection column pair in the yield analysis on the basis of the distance and the first score of each of the first target column and the second target column of the second target surjection column pair, and determining, by the computer, an analysis order of the surjection column pair in the yield analysis on the basis of the second score.

7. A computer which analyzes analysis data acquired from a system, the system including a plurality of devices to manufacture a product, wherein the analysis data is configured by a plurality of fields to store a parameter related to manufacturing the product, and at least one field to store an evaluation value indicating a quality of the product, wherein the computer includes a calculation device, a storage device connected to the calculation device, a network interface connected to the calculation device, a graph generating unit which analyzes a correspondence between columns, the column being a set of values of each field of the analysis data, and generates a graph connecting a column associated to the correspondence on the basis of a result of the analysis, and an analysis unit which performs a yield analysis to specify the parameter affecting the evaluation value on the basis of the graph and the analysis data, wherein the graph generating unit is configured to analyze a correspondence from a value belonging to a first target column to a value belonging to a second target column to specify a surjection column pair which is a set of the first target column and the second target column, the first target column and the second target column which have a subjective correspondence, and generate graph information to manage a first graph of a tree structure indicating a connection relation of the column by connecting a graph which has nodes of the first target column and the second target column of the surjection column pair, and wherein the analysis unit performs the yield analysis using the graph information.

8. The computer according to claim 7, wherein the graph generating unit is configured to generate one or more categories by classifying values belonging to the column to analyze a correspondence from a value belonging to the category of the first target column to a value belonging to the category of the second target column in a case where a correspondence from the value belonging to the first target column to the value belonging to the second target column is analyzed, select a first target surjection column pair in a case where the graph information is generated, generate a graph which has nodes of the first target column and the second target column of the first target surjection column pair, select a terminal column corresponding to a leaf node of the first graph, determine whether the first target column of the first target surjection column pair is matched to the terminal column, and connect a node corresponding to the second target column of the first target surjection column pair to a leaf node corresponding to the terminal column in a case where the first target column of the first target surjection column pair is matched to the terminal column.

9. The computer according to claim 8, wherein the graph generating unit is configured to specify a bijection column pair which is a set of the first target column and the second target column which have a bijective correspondence, and specify the surjection column pair from among a set of columns except the bijection column pair in a case where a correspondence from the value belonging to the first target column to the value belonging to the second target column is analyzed, select a target bijection column pair in a case where the graph information is generated, generate a graph which has nodes of the first target column and the second target column of the target bijection column pair, select the terminal column, determine whether the first target column of the target bijection column pair is matched to the terminal column, and the second target column of the target bijection column pair is different from a column corresponding to a node to which a node corresponding to the terminal column is connected, and connect a node corresponding to the second target column of the target bijection column pair to a node corresponding to the terminal column in a case where the first target column of the target bijection column pair is matched to the terminal column, and the second target column of the target bijection column pair is different from a column corresponding to a node to which a node corresponding to the terminal column is connected.

10. The computer according to claim 8,
wherein the graph generating unit is configured to set a range of a value in a case where a value belonging to the column which is a generation target of the category is an analogue value, and
generate the category on the basis of the range of the value.

11. The computer according to claim 8,
wherein the graph generating unit is configured to
reduce the numbers of the categories of the first target column and the categories of the second target column, and
analyze a correspondence from the value belonging to the category of the first target column to the value belonging to the category of the second target column.

12. The computer according to claim 8,
wherein the analysis unit is configured to
generate data of a second graph indicating a position of the analysis data in a feature space which has the evaluation value as an axis,
perform a clustering of the analysis data in the feature space which is paid attention to a specific column with respect to the column,
calculate a first score to evaluate the clustering on the basis of a result of the clustering,
select a second target surjection column pair,
calculate a distance between the first target column and the second target column of the second target surjection column pair in the second graph,
calculate a second score to determine an analysis order of the surjection column pair in the yield analysis on the basis of the distance and the first score of each of the first target column and the second target column of the second target surjection column pair, and
determine an analysis order of the surjection column pair in the yield analysis on the basis of the second score.

\* \* \* \* \*